United States Patent
Shen et al.

(10) Patent No.: US 12,141,000 B2
(45) Date of Patent: *Nov. 12, 2024

(54) CAPACITIVE DETECTION OF FOLD ANGLE FOR FOLDABLE DEVICES

(71) Applicant: Synaptics Incorporated, San Jose, CA (US)

(72) Inventors: Guozhong Shen, Fremont, CA (US); Tom Vandermeijden, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,048

(22) Filed: Oct. 9, 2023

(65) Prior Publication Data

US 2024/0168524 A1    May 23, 2024

Related U.S. Application Data

(63) Continuation-in-part of application No. 18/057,657, filed on Nov. 21, 2022, now Pat. No. 11,976,922.

(51) Int. Cl.
*G06F 1/16* (2006.01)
*G06F 3/041* (2006.01)
*G06F 3/044* (2006.01)

(52) U.S. Cl.
CPC .......... *G06F 1/1677* (2013.01); *G06F 1/1616* (2013.01); *G06F 3/0446* (2019.05); *G06F 3/04182* (2019.05)

(58) Field of Classification Search
CPC .... G06F 1/1677; G06F 1/1616; G06F 3/0446; G06F 3/04182
See application file for complete search history.

(56) References Cited

U.S. PATENT DOCUMENTS

| | | | |
|---|---|---|---|
| 9,152,225 B2 * | 10/2015 | Park | G06F 1/1626 |
| 9,189,016 B2 * | 11/2015 | Jang | G06F 1/1637 |
| 10,372,163 B2 * | 8/2019 | Miyake | G09F 9/301 |
| 10,528,088 B2 * | 1/2020 | Whitman | G06F 1/1618 |
| 10,539,978 B2 * | 1/2020 | Lee | H04M 1/0268 |
| 11,029,780 B1 | 6/2021 | Goudarzi et al. | |
| 11,073,945 B1 * | 7/2021 | Pundak | G06F 1/1647 |

(Continued)

FOREIGN PATENT DOCUMENTS

| | | |
|---|---|---|
| CN | 110097826 B | 8/2019 |
| WO | 2023015435 A1 | 2/2023 |

OTHER PUBLICATIONS

U.S. Appl. No. 17/861,022, filed Jul. 8, 2022.

(Continued)

*Primary Examiner* — Amy Onyekaba
(74) *Attorney, Agent, or Firm* — Leydig, Voit & Mayer, Ltd.

(57) ABSTRACT

A system for determining a fold angle of a foldable device, the system including a plurality of electrodes and a processing system, wherein the processing system is configured to obtain transcapacitance measurements via a subset of the plurality of electrodes; obtain absolute capacitance measurements via the subset of the plurality of electrodes; and determine the fold angle of the foldable device based on the transcapacitance measurements and the absolute capacitance measurements.

20 Claims, 22 Drawing Sheets

(56) References Cited

U.S. PATENT DOCUMENTS

| | | | |
|---|---|---|---|
| 11,573,663 B1* | 2/2023 | Yun | G06F 1/1643 |
| 2012/0306802 A1 | 12/2012 | McCracken | |
| 2013/0314376 A1 | 11/2013 | Chang | |
| 2016/0041650 A1 | 2/2016 | Roziere et al. | |
| 2017/0068275 A1* | 3/2017 | Lee | G06F 1/1643 |
| 2017/0097721 A1 | 4/2017 | Wang | |
| 2017/0176267 A1 | 6/2017 | Keller et al. | |
| 2017/0308195 A1 | 10/2017 | Haung | |
| 2018/0088633 A1* | 3/2018 | Whitman | G06F 1/1677 |
| 2019/0042042 A1* | 2/2019 | Hei | G06F 3/0446 |
| 2019/0064950 A1* | 2/2019 | Hsu | G06F 1/1616 |
| 2019/0121390 A1* | 4/2019 | Yang | G09G 3/3208 |
| 2019/0250671 A1* | 8/2019 | Park | G06F 3/0416 |
| 2020/0243004 A1* | 7/2020 | Zhao | G09G 3/035 |
| 2020/0257334 A1* | 8/2020 | Han | G06F 3/041 |
| 2021/0096723 A1* | 4/2021 | Morin | G06F 3/04182 |
| 2021/0141417 A1* | 5/2021 | Seo | G06F 1/1616 |
| 2021/0249615 A1* | 8/2021 | Lee | G06F 1/1652 |
| 2022/0011816 A1* | 1/2022 | Lee | G09F 9/301 |
| 2022/0069055 A1* | 3/2022 | Bok | H10K 59/40 |
| 2022/0075427 A1* | 3/2022 | Palmor | G06F 3/0418 |
| 2022/0103670 A1* | 3/2022 | Liao | H04M 1/0216 |
| 2022/0130910 A1 | 4/2022 | Mugiraneza et al. | |
| 2022/0139273 A1* | 5/2022 | Shepelev | H10N 30/302 |
| | | | 361/679.02 |
| 2022/0214716 A1* | 7/2022 | Kim | G06F 3/0443 |
| 2022/0344433 A1* | 10/2022 | Leng | H10K 59/8792 |
| 2023/0012245 A1* | 1/2023 | Li | G06F 1/1643 |
| 2023/0039953 A1* | 2/2023 | Seger, Jr. | G06F 1/1652 |
| 2023/0136768 A1* | 5/2023 | Chan | G06F 3/0416 |
| | | | 345/174 |
| 2023/0168717 A1* | 6/2023 | Seger, Jr. | G06F 1/1677 |
| | | | 361/679.02 |
| 2023/0168771 A1* | 6/2023 | Kim | G06F 3/0418 |
| | | | 345/174 |
| 2023/0291827 A1* | 9/2023 | Yang | H04M 1/72454 |

OTHER PUBLICATIONS

U.S. Appl. No. 18/057,675, filed Nov. 21, 2022.
U.S. Appl. No. 18/172,681, filed Feb. 22, 2023.
U.S. Appl. No. 18/057,657, filed Nov. 21, 2022.
U.S. Appl. No. 18/515,048, filed Nov. 20, 2023.

* cited by examiner

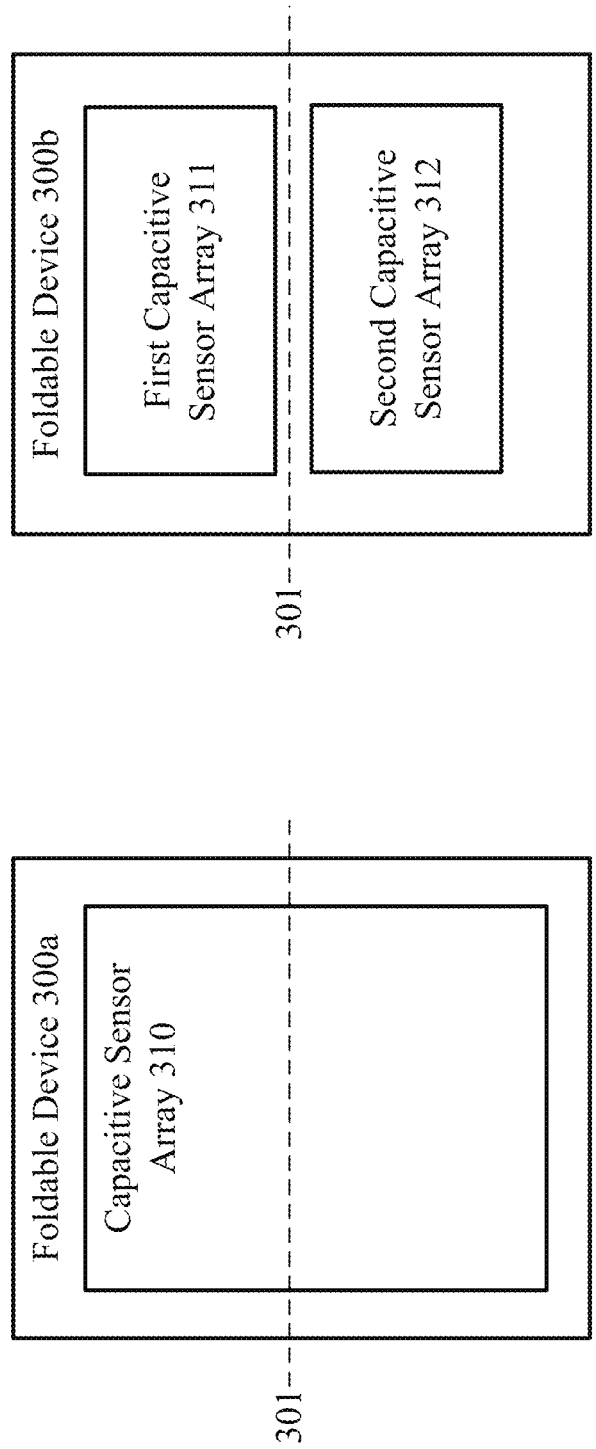

CAPACITIVE DETECTION OF FOLD ANGLE FOR FOLDABLE DEVICES

CROSS-REFERENCE TO RELATED APPLICATIONS

This patent application is a continuation-in-part of copending U.S. patent application Ser. No. 18/057,657, filed on Nov. 21, 2022, the entire disclosure of which is incorporated by reference herein in its entirety.

BACKGROUND

Input devices such as touch sensor devices (also commonly called touchpads or proximity sensor devices), are widely used in a variety of electronic systems. Touch sensor devices typically include a sensing region, often demarked by a surface, in which the touch sensor device determines the presence, location and/or motion of one or more input objects, typically for purposes allowing a user to provide user input to interact with the electronic system. Another type of input device may be a touchscreen that includes a plurality of electrodes and is also capable of allowing the user to provide user input to interact with the electronic system.

In recent years, foldable devices having touchscreens or other types of capacitive sensors have been developed. However, conventional foldable devices do not utilize their capacitive sensor(s) to detect a fold angle of the foldable device because of issues such as temperature sensitivity, errors attributable to changes in display image, and heavy filtering being needed. Rather, to detect a fold angle, conventional foldable devices use a dedicated set of gyroscopic sensors and/or accelerometers. Additionally, for detecting closure of the foldable device, conventional foldable devices use a dedicated IR sensor or Hall sensor.

SUMMARY

In an exemplary embodiment, the present disclosure provides a system for determining a fold angle of a foldable device. The system includes: a plurality of electrodes; and a processing system. The processing system is configured to: obtain transcapacitance measurements via a subset of the plurality of electrodes; obtain absolute capacitance measurements via the subset of the plurality of electrodes; and determine the fold angle of the foldable device based on the transcapacitance measurements and the absolute capacitance measurements.

In a further exemplary embodiment, determining the fold angle of the foldable device based on the transcapacitance measurements and the absolute capacitance measurements comprises canceling out interference associated with an input object based on combining the transcapacitance measurements and the absolute capacitance measurements.

In a further exemplary embodiment, the processing system is configured to obtain the transcapacitance measurements as part of a touch sensing operation for determining a position of an input object in a sensing region of the foldable device.

In a further exemplary embodiment, the processing system is configured to obtain the transcapacitance measurements in a different sensing step relative to obtaining the absolute capacitance measurements.

In a further exemplary embodiment, the processing system is further configured to: prior to obtaining the transcapacitance measurements and obtaining the absolute capacitance measurements, obtain a set of baseline reference measurements.

In a further exemplary embodiment, the processing system is configured to obtain the set of baseline reference measurements while the foldable device is closed, and the processing system is further configured to: determine that the foldable device is closed prior to obtaining the set of baseline reference measurements.

In a further exemplary embodiment, the processing system is further configured to: buffer obtained baseline reference measurements; determine that the foldable device is no longer closed; and in response to determining that the foldable device is no longer closed, select buffered baseline reference measurements from a predetermined amount of time prior to determining that the foldable device is no longer closed as the buffered baseline reference measurements to be used for determining the fold angle of the foldable device.

In a further exemplary embodiment, the processing system is further configured to: prior to obtaining the transcapacitance measurements and obtaining the absolute capacitance measurements, detect that an input object is proximate to a hinge of the foldable device.

In a further exemplary embodiment, detecting that the input object is proximate to the hinge of the foldable device comprises: determining a difference between a first set of transcapacitive measurements corresponding to a first transmitter electrode of the plurality of electrodes and a second set of transcapacitive measurements corresponding to a second transmitter electrode of the plurality of electrodes; and determining that the difference is greater than an object detection threshold.

In a further exemplary embodiment, the first set corresponds to a maximum out of the transmitter electrodes of the plurality of electrodes, and the second set corresponds to a minimum out of the transmitter electrodes of the plurality of electrodes.

In another exemplary embodiment, the present disclosure provides a method for determining a fold angle of a foldable device. The method includes: obtaining, by a processing system, transcapacitance measurements via a subset of a plurality of electrodes of the foldable device; obtaining, by the processing system, absolute capacitance measurements via the subset of the plurality of electrodes; and determining, by the processing system, the fold angle of the foldable device based on the transcapacitance measurements and the absolute capacitance measurements.

In yet another exemplary embodiment, the present disclosure provides a non-transitory computer-readable medium having processor-executable instructions stored thereon for determining a fold angle of a foldable device. The processor-executable instructions, when executed, facilitate: obtaining, by a processing system, transcapacitance measurements via a subset of a plurality of electrodes of the foldable device; obtaining, by the processing system, absolute capacitance measurements via the subset of the plurality of electrodes; and determining, by the processing system, the fold angle of the foldable device based on the transcapacitance measurements and the absolute capacitance measurements.

BRIEF DESCRIPTION OF THE DRAWINGS

FIGS. 3A-3B are block diagrams depicting examples of foldable devices in accordance with exemplary embodiments of the present disclosure.

DETAILED DESCRIPTION

Figure 1:
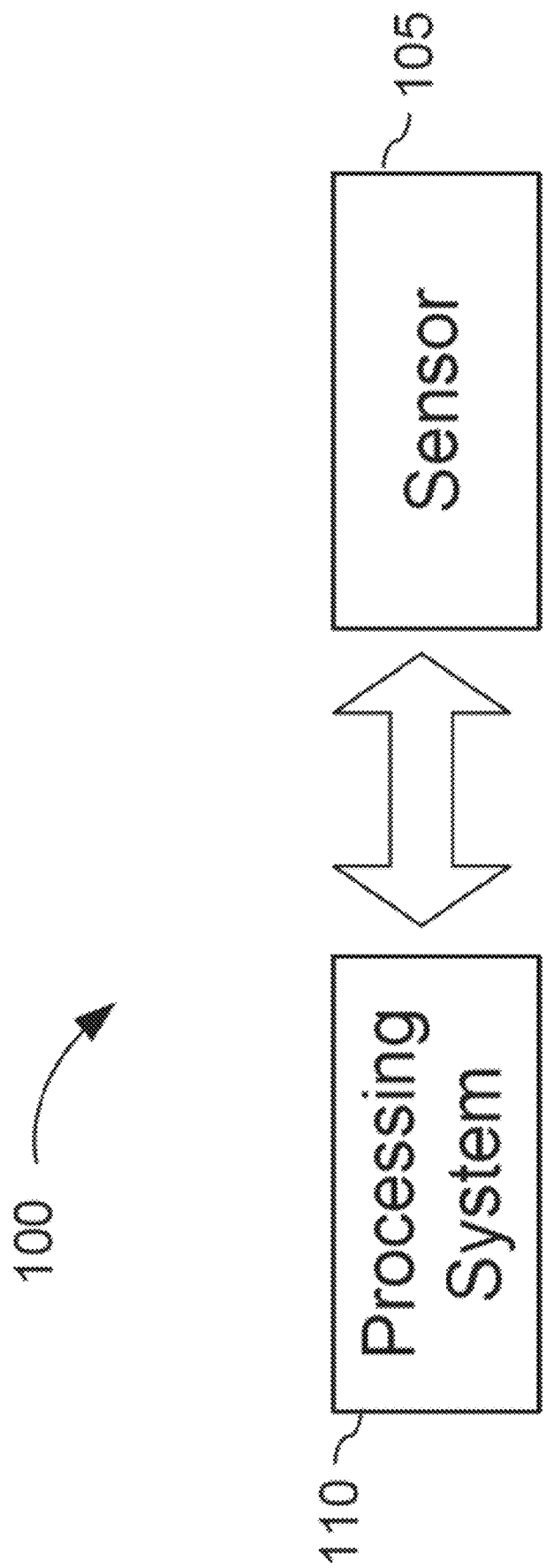
FIG. 1 is a block diagram depicting an example input device.

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

Exemplary devices and methods discussed herein provide for detecting a fold angle for foldable devices such as a foldable mobile device. The foldable device may include a capacitive sensor (such as a touchscreen display) that spans across a fold line (also referred to as a hinge) in the device, or the foldable device may include multiple capacitive sensors with at least one capacitive sensor on each side of a fold line in the foldable device. According to exemplary embodiments of the present disclosure, the foldable device may use the capacitive sensor(s) to detect a fold angle (wherein detection of the fold angle may include detecting whether the foldable device is open or closed), while avoiding accuracy problems due to temperature change and display noise, and without the use of temporal filters. Thus, exemplary embodiments of the present disclosure are able to achieve accurate and timely fold angle detection for a foldable device while eliminating the need for an open/closed sensor such as an IR sensor or a Hall sensor and further eliminating the need for a set of gyroscopic sensors and/or accelerometers for determining the fold angle.

It will therefore be appreciated that, by using capacitive sensor(s) of a foldable device to detect a fold angle of the foldable device, exemplary embodiments of the present disclosure achieve various advantages relative to conventional foldable devices—including, but not limited to, reduction in bill of material (BOM) costs, assembly labor, simplification of product design, avoidance of interference to the display caused by magnetic switch, improved reliability (a statistical side effect of fewer parts), etc.

Further, exemplary embodiments of the present disclosure provide for accurate detection of a fold angle of a foldable device even when a finger (or other input object) is present proximate to the sensor electrodes being used for fold angle detection. Ordinarily, the presence of a finger (or other input object) may interfere with absolute capacitance measurements taken using such sensor electrodes, but the present disclosure provides for utilizing transcapacitive measurements (e.g., obtained during touch sensing operation of the foldable device) in combination with absolute capacitance measurements obtained for fold angle detection to cancel out interference caused by the presence of the finger (or other input object).

For reference in the present application, a fold angle of 0° is referred to as the foldable device being closed, a fold angle of 180° is referred to as the foldable device being open flat, a fold angle of between 0° and 180° is referred to as the foldable device being folded forward. Further, for foldable devices which are able to be folded backwards in addition to being folded forwards, a fold angle of 360° is referred to as the foldable device being fully folded backwards, and a fold angle of between 180° and 360° is referred to as the foldable device being folded backwards.

FIG. 1 is a block diagram depicting an example input device to illustrate the working principles of a capacitive sensor. The input device 100 may be configured to provide input to an electronic system. As used herein, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 may be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In FIG. 1, a sensor 105 is included with the input device 100. The sensor 105 comprises one or more sensing elements configured to sense input provided by one or more input objects in a sensing region. Examples of input objects include fingers, styli, and hands. The sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region.

The input device 100 is a capacitance (e.g., transcapacitive or absolute capacitance ("abs-cap")) input device, wherein voltage or current is applied to create an electric field. Nearby input objects cause changes in the electric field, and produce detectable changes in capacitive coupling that may be detected as changes in voltage, current, or the like.

The input device utilizes arrays or other regular or irregular patterns of capacitive sensing elements to create electric fields. In some instances, separate sensing elements may be ohmically shorted together to form larger sensor electrodes. Some other instances may utilize resistive sheets, which may be uniformly resistive.

The input device may utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive ("abs-cap") measurements.

The input device may utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented, for example, as a capacitive touch sensor having a relatively lower resolution, or as a capacitive fingerprint sensor having a relatively higher sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 $mm^2$ or less. In another exemplary embodiment, a partial placement sensor has an imaging area in the range of 20-50 $mm^2$. In some implementations, the partial fingerprint sensor has an input surface that is the same size the imaging area.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
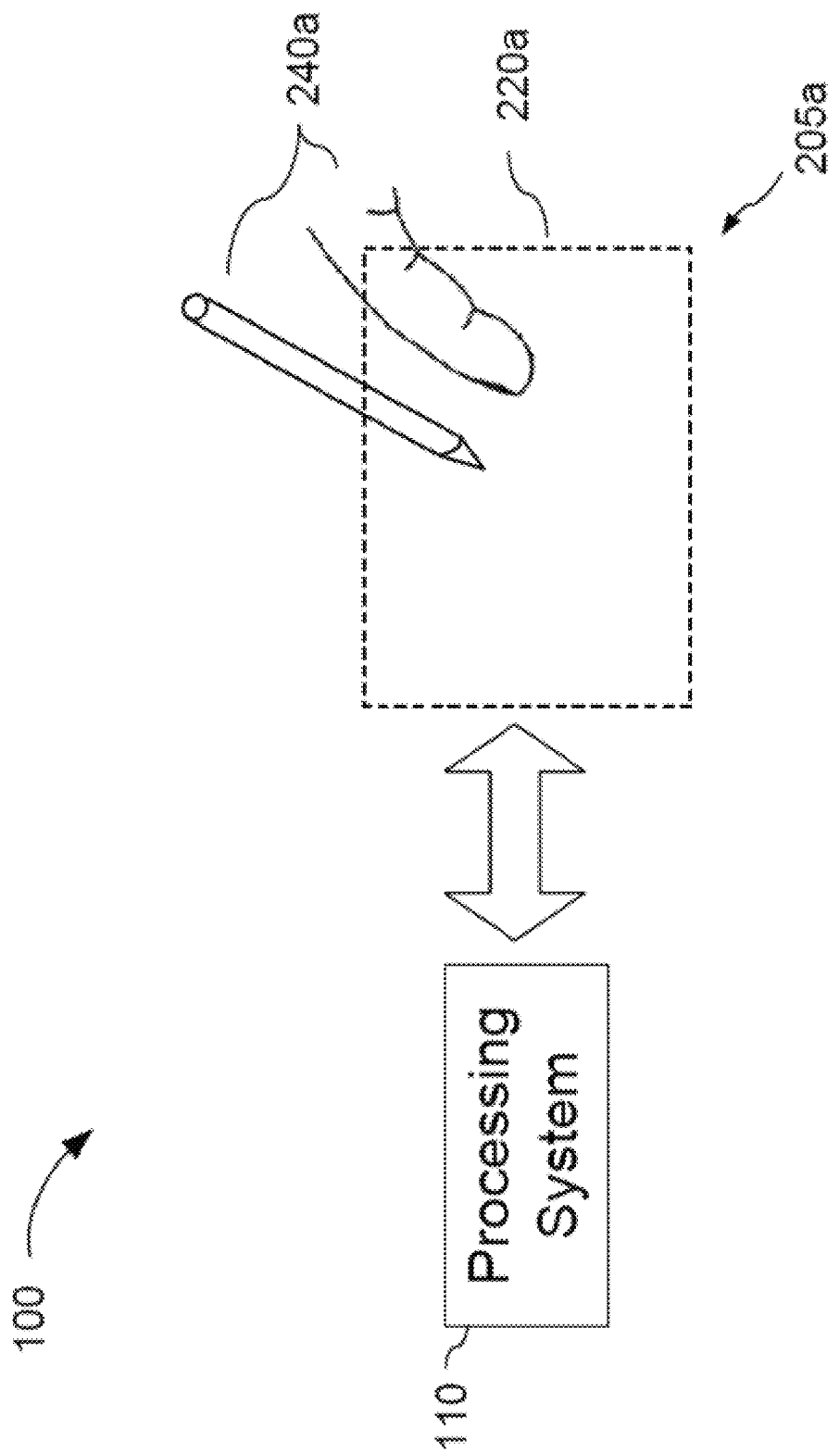
FIGS. 2A-2B are block diagrams depicting further examples of input devices.
Figure 2B:
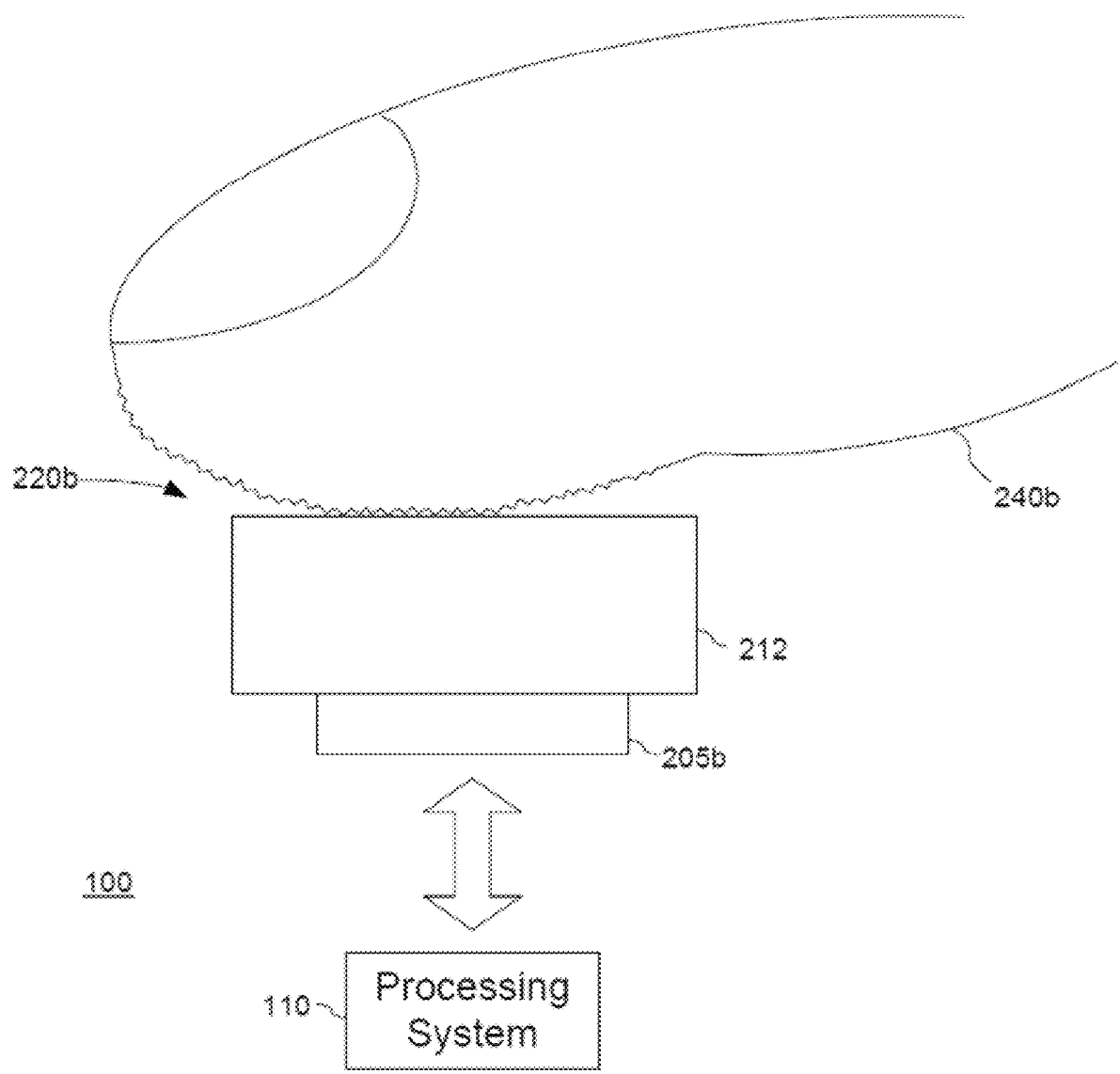

FIGS. 2A-2B are block diagrams depicting further examples of input devices to illustrate the working principles of capacitive sensors. In FIG. 2A, the input device 100 is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint from a finger 240b. The fingerprint sensor 205b is disposed underneath a cover layer 212 that provides an input surface for the fingerprint to be placed on or swiped over the fingerprint sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A.

FIGS. 3A-3B are block diagrams depicting examples of foldable devices in accordance with exemplary embodiments of the present disclosure. In FIG. 3A, foldable device 300a has a single capacitive sensor array 310 which spans both sides of fold line 301. Capacitive sensor array 310 may be, for example, part of a foldable touchscreen display which is part of a foldable mobile device. In FIG. 3B, foldable device 300b has multiple capacitive sensor arrays, including a first capacitive sensor array 311 on one side of fold line 301 and a second capacitive sensor array 312 on the other side of fold line 301. In one exemplary implementation, both the first and second capacitive sensor arrays 311, 312 are controlled by a single touch controller, and in another exemplary implementation, the first and second capacitive sensor arrays 311, 312 are controlled by separate touch controllers. In one exemplary implementation, both the first and second capacitive sensor arrays 311, 312 are part of respective touchscreens, and in other exemplary implementations, the first and second capacitive sensor arrays 311, 312 may be parts of different input devices (e.g., one may be a touchscreen display while the other is a touchpad or fingerprint sensor).

It will be appreciated that the foldable device depicted in FIGS. 3A-3B are merely exemplary, and that exemplary embodiments of the foldable device may be implemented with other types of foldable devices as well. For example, the principles discussed herein are also applicable to foldable devices with more than one fold line and/or more than two capacitive sensor arrays.

Figure 4A:
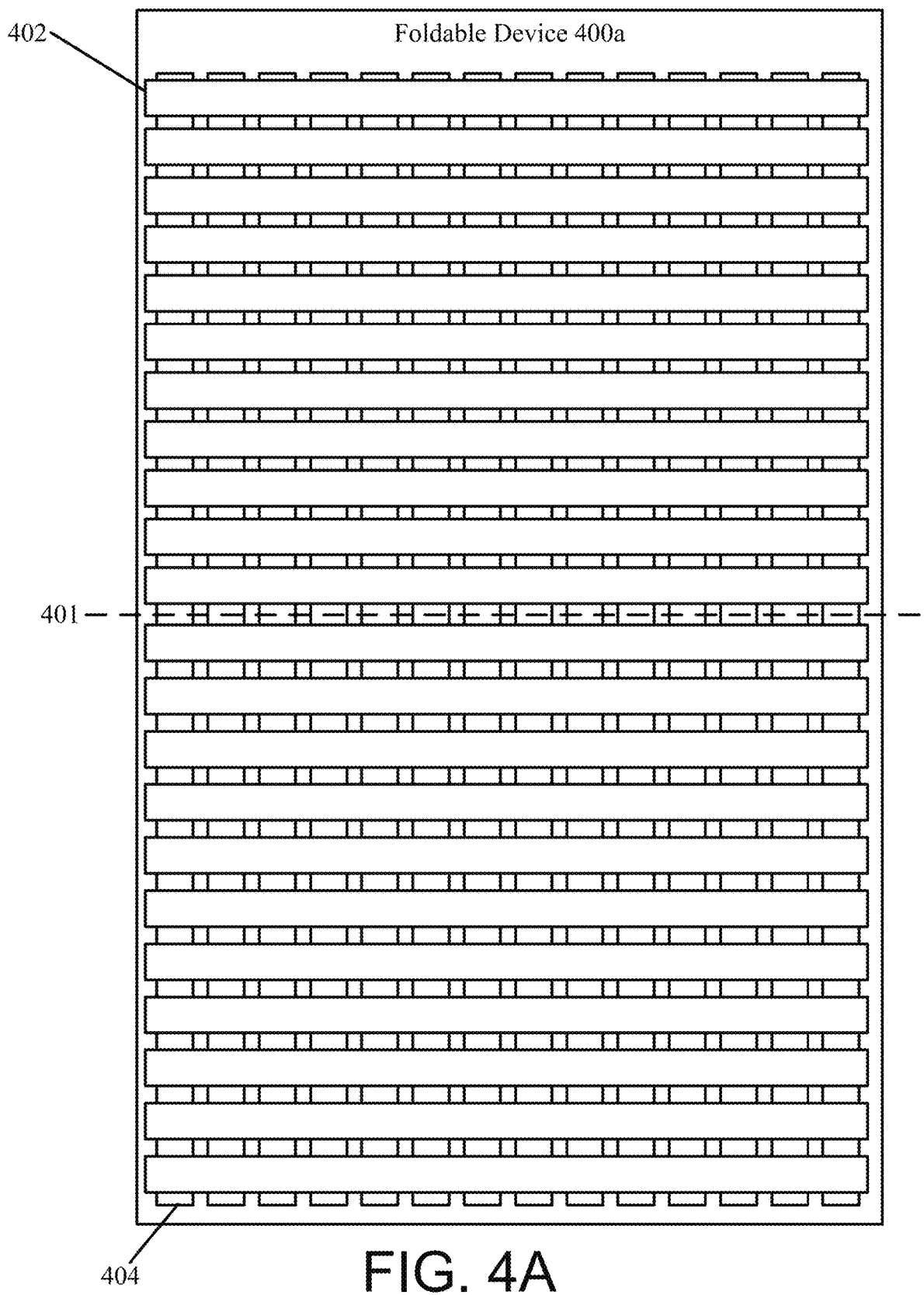
FIGS. 4A-4B depict examples of capacitive sensor arrays for exemplary foldable devices in accordance with exemplary embodiments of the present disclosure.
Figure 4B:
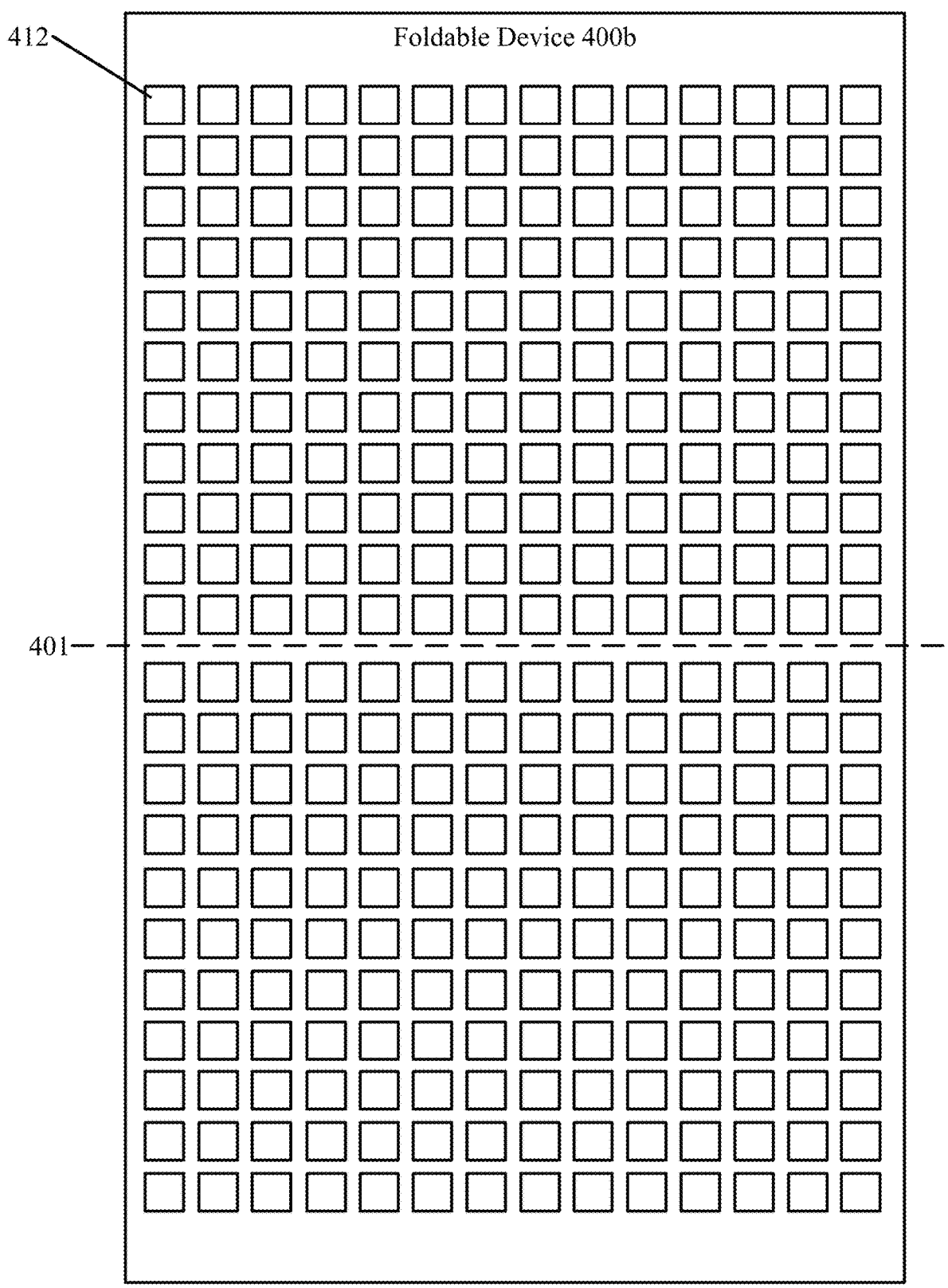

FIGS. 4A-4B depict examples of capacitive sensor arrays for exemplary foldable devices in accordance with exemplary embodiments of the present disclosure. In FIG. 4A, foldable device 400a includes a multi-layer metal mesh (MM) array of rectangular sensor electrodes in a bars-and-stripes pattern which spans across fold line 401. Thus, sensor electrodes depicted in FIG. 4A correspond to an exemplary implementation of the capacitive sensor array 310 of FIG. 3A. In this example, to operate the sensor electrodes for touch sensing, the horizontal electrodes 402 may be operated as receiver (Rx) electrodes and the vertical electrodes 404 may be operated as transmitter (Tx) electrodes, such that based on driving the Tx electrodes with sensing signals, resulting signals are obtained via the Rx electrodes which provide capacitive touch sensing information for each intersection between respective Tx and Rx electrodes. It will be appreciated that electrodes depicted in FIG. 4A may also be operated in an absolute capacitance manner (for example, as discussed below with regard to detecting a fold angle).

In FIG. 4B, foldable device 400b includes a single-layer metal mesh (MM) array of sensor electrodes in the form of sensing pads 412. The sensing pads 412 are disposed on both sides of fold line 401. In one implementation, the sensing pads 412 are all part of a single capacitive sensor array (see capacitive sensor array 310 of FIG. 3A), and in another implementation, the sensing pads 412 above the fold line 401 are part of a first capacitive sensor array and the sensing pads 412 below the fold line 401 are part of a second capacitive sensor array (see first and second capacitive sensor arrays 311, 312 of FIG. 3B). For abs-cap sensing using the sensing pads 412, each respective sensing pad 412 is driven and a resulting signal is obtained therefrom, thereby providing capacitive touch sensing information for each sensing pad location.

Figure 4D:
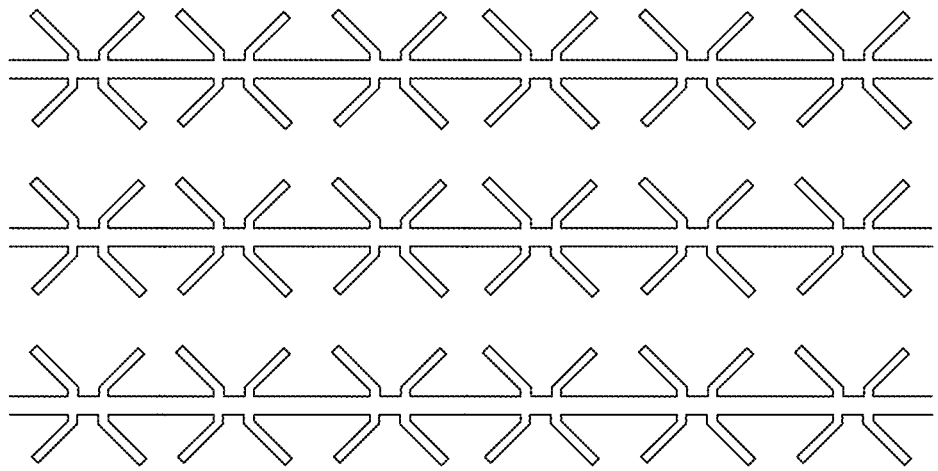
FIGS. 4C-4D depict example shapes of RX and TX electrodes, respectively.
Figure 4C:
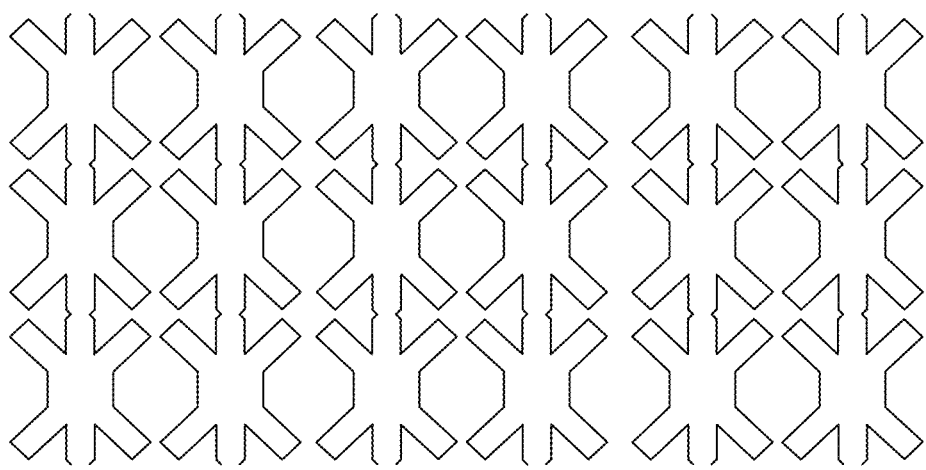

It will be appreciated that although examples depicted and described herein refer to bars-and-stripes electrode configurations for simplicity, in practice, a plurality of different type of electrode shapes and configurations may be used. A person of ordinary skill in the art would understand that many different types of special electrode shapes (e.g., designed to be optimized for specific respective devices) behave in a manner analogous to bars-and-stripes electrodes, and the principles discussed herein are applicable to all such variations of electrode shapes and configurations. For example, FIG. 4C depicts an example shape for 6 RX electrodes, and FIG. 4D depicts an example shape for 3 TX electrodes (which may be disposed beneath the 6 RX electrodes of FIG. 4C), and these electrodes depicted in FIGS. 4C-4D conceptually behave in a manner analogous to bars-and-stripes electrodes such that the principles discussed herein are applicable thereto. Further, it will be appreciated that, for the configuration depicted in FIG. 4B, the sensing pads proximate to the hinge of the foldable device may be connected together and operated in an absolute capacitance manner as discussed below in connection with FIGS. 5A-9).

Additionally, it will be appreciated that sensing electrodes utilized in embodiments of the present disclosure (such as the sensing electrodes depicted in FIGS. 4A-4D), whether configured in a bars-and-stripes configuration or other configuration, may be solid conductors, mesh conductors, a mix of solid and mesh, or may involve other metal patterns. For example, for an OLED on-cell sensor, the sensing electrodes may be metal mesh to provide openings for LED light to pass through.

It will further be appreciated that, in the exemplary embodiments discussed herein, the sensor electrodes utilized for obtaining absolute capacitance measurements for fold angle detection are advantageously sensor electrodes of a plurality of touch sensing sensor electrodes of the foldable device which are also used for performing touch sensing (i.e., a processing system of the foldable device, during touch sensing operation, obtains touch sensing measurements via the touch sensing sensor electrodes and determines a position of an input object in a sensing region corresponding to the plurality of electrodes). The touch sensing operation of the foldable device (in which the electrodes of the foldable device may be operated, for example, in a two-dimensional transcapacitive sensing manner during which the vertical electrodes in FIG. 4A are operated as TX electrodes and the horizontal electrodes of FIG. 4A are operated as RX electrodes) and the fold angle detection operation of the foldable device (in which horizontal electrodes of FIG. 4A proximate to a hinge of the foldable device are operated in an absolute capacitance manner, as discussed in further detail below in connection with FIGS. 5A-9) may be, for example, continuously and/or periodically carried out while the foldable device is open, with the touch sensing and the fold angle detection being performed in separate sensing steps. It will be appreciated that a "sensing step" refers to a sensing increment which may include a driving waveform burst with signal integration and a sample/hold period followed by analog-to-digital conversion (ADC) processing. A single sensing step may last, for example, around 50 μs, whereas two sensing steps would take, for example, 100 μs.

Figure 5A:
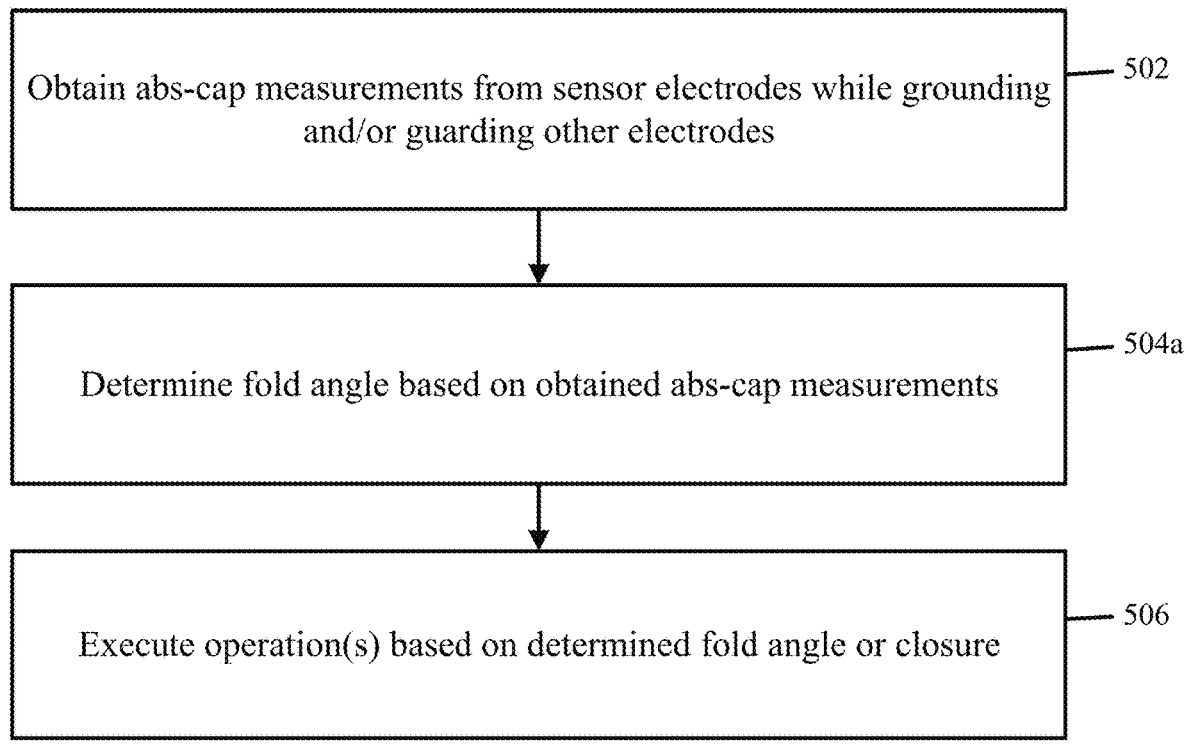
FIGS. 5A-5B are flowcharts of exemplary processes for capacitively determining a fold angle of a foldable device in accordance with exemplary embodiments of the present disclosure.

FIG. 5A is a flowchart of an exemplary process 500a for capacitively determining a fold angle of a foldable device in accordance with exemplary embodiments of the present disclosure. At stage 502, a subset of sensor electrodes of a foldable device are driven, and absolute capacitance measurements are obtained from that subset of sensor electrodes. Other sensor electrodes of the foldable device may be grounded and/or guarded. In accordance with exemplary embodiments of the present disclosure, the absolute capacitance measurements obtained from a subset of sensor electrodes under measurement include at least one absolute capacitance measurement obtained from at least one sensor electrode whose dimensions are changed by bending at the fold line of the foldable device (referred to herein as at least one "first" sensor electrode) and at least one sensor electrode whose dimensions are unchanged (or minimally changed) by the bending of the foldable device (referred to herein as at least one "second" sensor electrode, which is farther from a fold line of the foldable device than the at least one first sensor electrode). It is advantageous, but not necessarily required, for the at least one first sensor electrode and the at least one second sensor electrode to be proximate to one another such that common effects (such as due to temperature or display noise) affect the electrodes in a relatively similar manner. As will be explained below, the measurement(s) from the at least one "first" sensor electrode contain the relevant signal from which the fold angle can be determined, and the measurement(s) from the at least one "second" sensor electrode are used to cancel out or remove interference caused by common factors such as temperature drift and display noise.

In an exemplary embodiment (as depicted and discussed in further detail below in connection with FIG. 7A), the absolute capacitance measurements obtained from the subset of sensor electrodes under measurement include two absolute capacitance measurements from two sensor electrodes whose dimensions are changed by bending at the fold line of the foldable device, wherein these two sensor electrodes (B and C) are on opposing sides of the fold line, as well as two absolute capacitance measurements from two sensor electrodes whose dimensions are unchanged (or minimally changed) by bending at the fold line of the foldable device, wherein these two sensor electrodes (A and D) are also on opposing sides of the fold line.

In another exemplary embodiment (as depicted and discussed in further detail below in connection with FIG. 9), the absolute capacitance measurements obtained from a subset of sensor electrodes under measurement include one absolute capacitance measurement from one sensor electrode whose dimensions are changed by bending at the fold line of the foldable device and one absolute capacitance measurement from one sensor electrode whose dimensions are unchanged (or minimally changed) by bending at the fold line of the foldable device, wherein the two sensor electrodes (e.g., A and B) are on the same side of the fold line.

In yet another exemplary embodiment (as depicted and discussed in further detail below in connection with FIG. 8), the absolute capacitance measurements obtained from a subset of sensor electrodes under measurement include one absolute capacitance measurement from one sensor electrode (e.g., H) disposed at the fold line and whose dimensions are changed by bending at the fold line of the foldable device, as well as two absolute capacitance measurement from two sensor electrodes whose dimensions are unchanged (or minimally changed) by bending at the fold line of the foldable device, wherein the two sensor electrodes (e.g., A and D) are on opposing sides of the fold line.

At stage 504a, based on the absolute capacitance measurements obtained from the subset of sensor electrodes at stage 502, a processing system of the foldable device determines a fold angle of the foldable device. As will be explained in further detail below, this determination takes into account reference absolute capacitance measurements taken at a known fold angle (e.g., based on calibrations performed in production and/or in runtime), such that the processing system is able to take the absolute capacitance measurements from stage 502 and determine a fold angle therefrom.

At stage 506, the processing system (or another processor of the foldable device) executes one or more operations based on the determined fold angle. For example, the content displayed on a foldable device may be based on the fold angle of the foldable device. In one implementation, if the device is only partially open (such as around ½ open or ¼ open), only the bottom portion of the display (e.g., below the fold line) is turned on and used to display notifications, reminders, time, battery life, and/or other information, while a top portion of the display (e.g., above the fold line) is off. This may further include displaying more detailed information (such as including notifications, reminders, time, and battery life) based on the foldable device being around ½ open and displaying less information (such as only including time and battery life) based on the foldable device being around ¼ open. In another example, based on a foldable device being open at a fold angle at or around 90 degrees (half-open), the top half display of the foldable device may show a video or live camera feed, while the bottom half display of the foldable device provides user interface control elements (e.g., displays touchscreen controls, such as for pause, play fast forward, rewind, video editing, camera shutter, etc.). The top half display may further be provided at a relatively faster display update rate, while the bottom half display is provided at a relatively slower display update rate. In yet another example, based on a foldable device being open at a fold angle at or around 360 degrees (fully folded backwards), certain applications may use the two sides of the foldable device for different functions (e.g., a "stud finder" application may use one side of the foldable device for detecting studs under drywall and the other side of the foldable device for displaying the location of the stud).

Figure 5B:
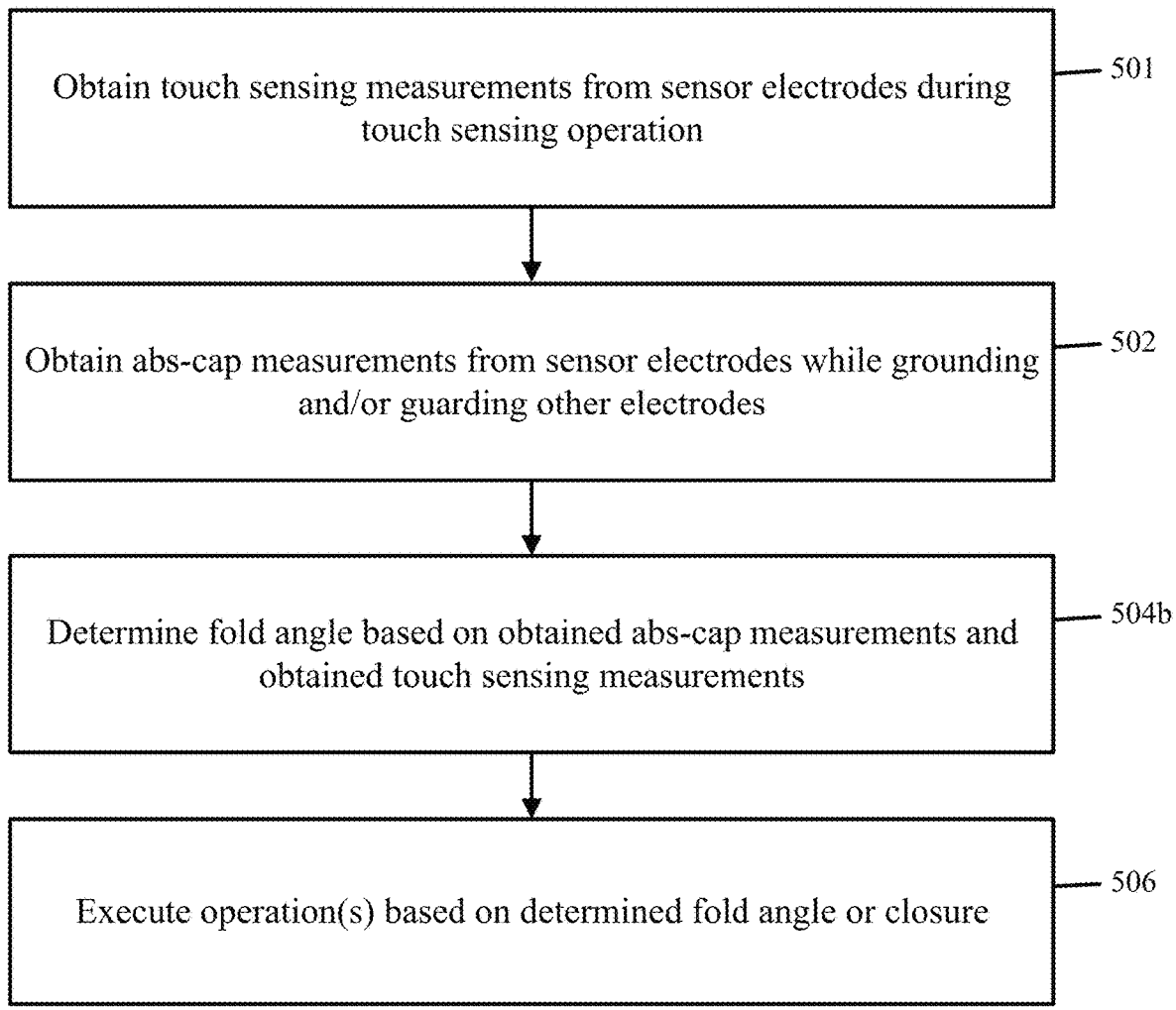

FIG. 5B is a flowchart of another exemplary process 500b for capacitively determining a fold angle of a foldable device in accordance with exemplary embodiments of the present disclosure. At stage 501, touch sensing measurements are obtained from the sensor electrodes of the foldable device (e.g., during a touch sensing operation of the foldable device). For example, the sensor array of the foldable device is operated in a two-dimensional transcapacitive manner (e.g., the vertical electrodes of FIG. 4A are operated as TX electrodes, and the horizontal electrodes of FIG. 4A are operated as RX electrodes) to determine touch sensing measurements which are used by the processing system to determine presence and/or position of a finger or other input object with respect to a sensing region of the foldable device. At stage 502, which may occur before or after stage 501 in a separate sensing step, absolute capacitance measurements are obtained from electrodes of the foldable device near the hinge of the foldable device (e.g., similar to stage 502 of FIG. 5A above). At stage 504b, the fold angle is determined by the processing system of the foldable device based on the obtained absolute capacitance measurements from stage 502 and the transcapacitive touch sensing measurements obtained from stage 501, whereby interference from a finger or other input object is canceled out based on considering the two sets of measurements together (as will be discussed in more detail below). At stage 506, the processing system (or another processor of the foldable device) executes one or more operations based on the determined fold angle (e.g., similar to stage 506 of FIG. 5A above).

Figure 5C:
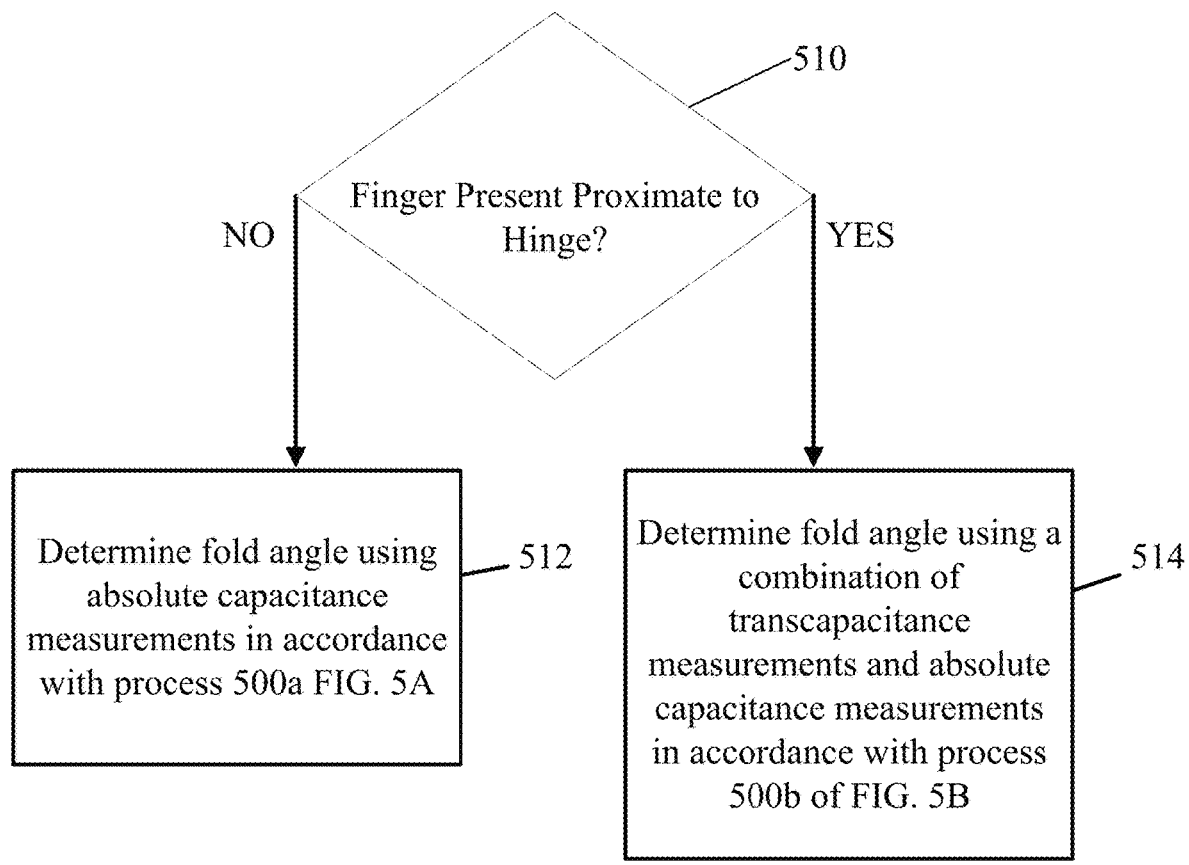
FIG. 5C is flowchart of an exemplary process for determining fold angle using absolute capacitance measurements only or using a combination of transcapacitance measurements and absolute capacitance measurements.

It will be appreciated that starting of a touch sensing operation may be triggered by a finger being detected as being proximate to a sensing region of the foldable device, such that stage 501 of FIG. 5B is performed in response to a finger being present. Further, the fold angle detection process 500b of FIG. 5B (and stages 501 and 504b thereof) is advantageous and may be performed under conditions where a finger (or other input object) is present proximate to the hinge of the foldable device (i.e., proximate to the touch sensing electrodes at or near the hinge used for fold angle detection). In situations where a finger (or other input object) is not present near the hinge of the foldable device, the process 500a of FIG. 5A may be performed for fold angle detection (as interference from a finger or other input object is not a problem for fold angle detection in such situations). This is depicted in FIG. 5C, which is a flowchart of an exemplary process 500c for determining a fold angle based solely on absolute capacitance measurements at stage 512 (in case of a finger not being present, as determined at stage 510) and based on a combination of transcapacitive measurements and absolute capacitance measurements at stage 514 (in case of a finger being present, as determined at stage 510).

Figure 6A:
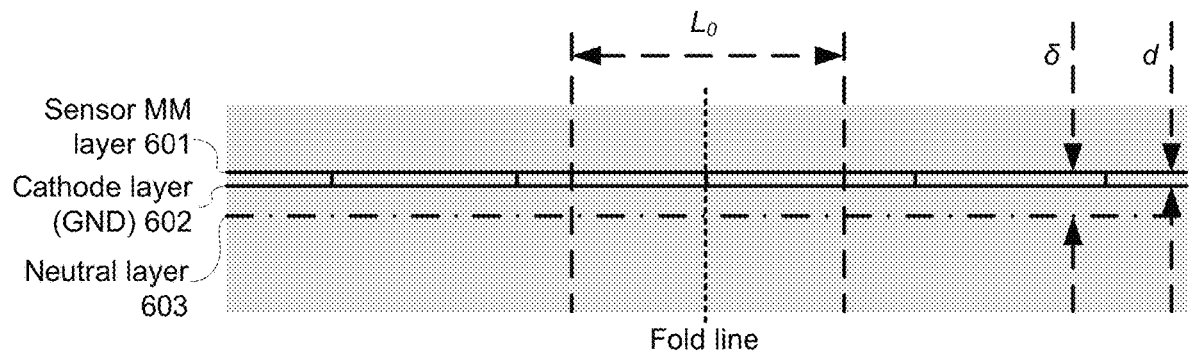
FIGS. 6A-6B depict examples of a foldable device in an open flat state and a folded forwards state to illustrate working principles of exemplary embodiments of the present application.
Figure 6B:
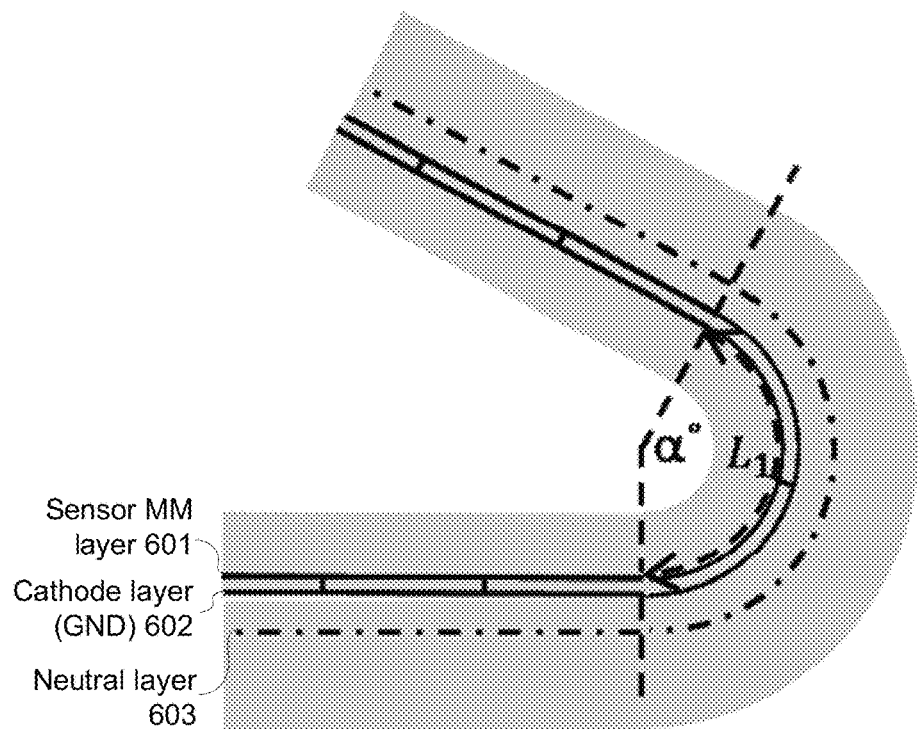

FIGS. 6A-6B depict examples of a foldable device in an open flat state (FIG. 6A) and a folded forwards state (FIG. 6B) to illustrate working principles of exemplary embodiments of the present application. In FIG. 6A, when the foldable device is open flat with no bending, a respective portion of a sensor metal mesh (MM) layer 601 has a length of $L_0$. When the foldable device is then bent forwards by an angle of $\alpha°$ as shown in FIG. 6B, the length of the respective portion of the sensor MM layer changes to a length of $L_1$. Further, a neutral layer 603 of the foldable device is shown in FIGS. 6A-6B. The neutral layer 603 of the foldable device maintains the same length with and without bending even at and near the fold line, and display elements of a display module of the foldable device (e.g., a thin-film transistor (TFT) backplane of the display module) which are relatively more fragile may be positioned at the neutral layer 603 to minimize squeezing and stretching of those components. When bending the foldable device forwards (i.e., from the position shown in FIG. 6A to the position shown in FIG. 6B, corresponding to positive $\alpha°$), portions of the foldable device which are above the neutral layer and proximate to the fold line are squeezed (shortened), whereas portions of the foldable device which are below the neutral layer and proximate to the fold line are stretched (lengthened). When bending the foldable device backwards (corresponding to negative $\alpha°$), portions of the foldable device which are above the neutral layer and proximate to the fold line are stretched (lengthened), whereas portions of the foldable device which are below the neutral layer and proximate to the fold line are squeezed (shortened). It will be appreciated that the fold angle of the foldable device, as referred to herein, corresponds to 180°-$\alpha°$, such that, for example, a fold angle of 0° (closed state) corresponds to $\alpha$=180; a fold angle of 90° (half-open state) corresponds to $\alpha$=90; a fold angle of 180° (open flat state) corresponds to $\alpha$=0; and a fold angle of 360° (fully folded backwards state) corresponds to $\alpha$=−180.

In the example shown in FIGS. 6A-6B, the sensor MM layer 601 of the foldable device, as well as a cathode layer (GND) 602 of the foldable device, are above a neutral layer 603 of the foldable device. Thus, the length of the respective portion of the sensor metal mesh (MM) layer 601, which may span multiple sensor electrodes, is shortened from $L_0$ to $L_1$ when the foldable device is folded forwards from the open position shown in FIG. 6A to the folded position shown in FIG. 6B. This change in length is governed by the following equation:

$$L_1 - L_0 = \pi * \delta * \alpha° / 180°$$

where $\delta$ is the distance between the sensor MM layer and the neutral layer (see FIG. 6A). According to the conventions for this example, $\delta$ is negative when the sensor MM layer is above the neutral layer (corresponding to $L_1-L_0$ being negative and $L_1$ being shorter than $L_0$), and $\delta$ would be positive if the sensor MM layer were to be below the neutral layer (corresponding to $L_1-L_0$ being positive and $L_1$ being longer than $L_0$).

The metal mesh width (w) and the distance between the sensor MM layer and cathode layer (d in FIG. 6A) will also change based on the bending of the foldable device, and it can be assumed that the same ratio $\beta$ applies, such that changes to w and d can be canceled out. That is, the capacitance $C_b$ between the cathode layer and a respective sensor electrode affected by the bending is proportional to $$\frac{W(1-\beta)L_1}{d(1-\beta)},$$

which can be expressed as $$\frac{wL_1}{d}$$

with the 1-$\gamma$ terms canceled out. It will be appreciated that the capacitance $C_b$ measured by the respective sensor electrode may also be affected by the changing dimensions of insulators around the respective sensor electrode in addition to the changing dimensions of the respective sensor electrode itself, but the relationship between the change in capacitance and the amount of bending remains linearly proportional.

Additionally, the distance between the sensor MM layer and the cathode layer is typically relatively small (e.g., ~10 μm) relative to the bending radius (e.g., which may be in the range of a few millimeters), such that a change in the capacitance $C_b$—i.e., $\Delta C_b$—caused by folding for a sensor electrode whose dimensions are changed by folding can simply be considered as being proportional to $\pi * \delta * \alpha° / 180°$. $\Delta C_b$ for a sensor electrode whose dimensions are changed by folding thus has a linear relationship relative to the bending angle. Based on measuring $C_b$ and/or determining $\Delta C_b$, the processing system of a foldable device can determine the fold angle of the foldable device (see stages 504a and 504b of FIGS. 5A-5B).

In one exemplary implementation, the pitch of a respective electrode is 4 mm, the capacitance $C_b$ is 200 pF, and the sensor MM layer to neutral layer distance $\delta$ is −50 μm. This results in a $\Delta C_b$ per 1° bend of 200 pF/4 mm*π*−0.050 mm/180=−0.044 pF, and for a 90° bend, that would be a signal level of ~4 pF. This provides a sufficiently high signal level for $\Delta C_b$ to discriminate between different fold angles.

As mentioned above, conventional foldable devices do not utilize their capacitive sensor(s) to detect a fold angle of the foldable device because of issues such as temperature sensitivity, errors attributable to changes in display image, and heavy filtering being needed. Exemplary embodiments of the present disclosure, however, are able to avoid these issues based on obtaining absolute capacitance measurements for one or more sensor electrodes affected by bending together with one or more sensor electrodes not affected (or less affected) by bending. In particular, at stage 502 of FIGS. 5A-5B, absolute capacitance measurements ($C_b$) are obtained for one or more sensor electrodes affected by bending as well as one or more sensor electrodes not affected (or less) by bending. The multiple $C_b$ values are then used at stages 504a and 504b of FIGS. 5A-5B to determine a fold angle of the foldable device.

Figure 7A:
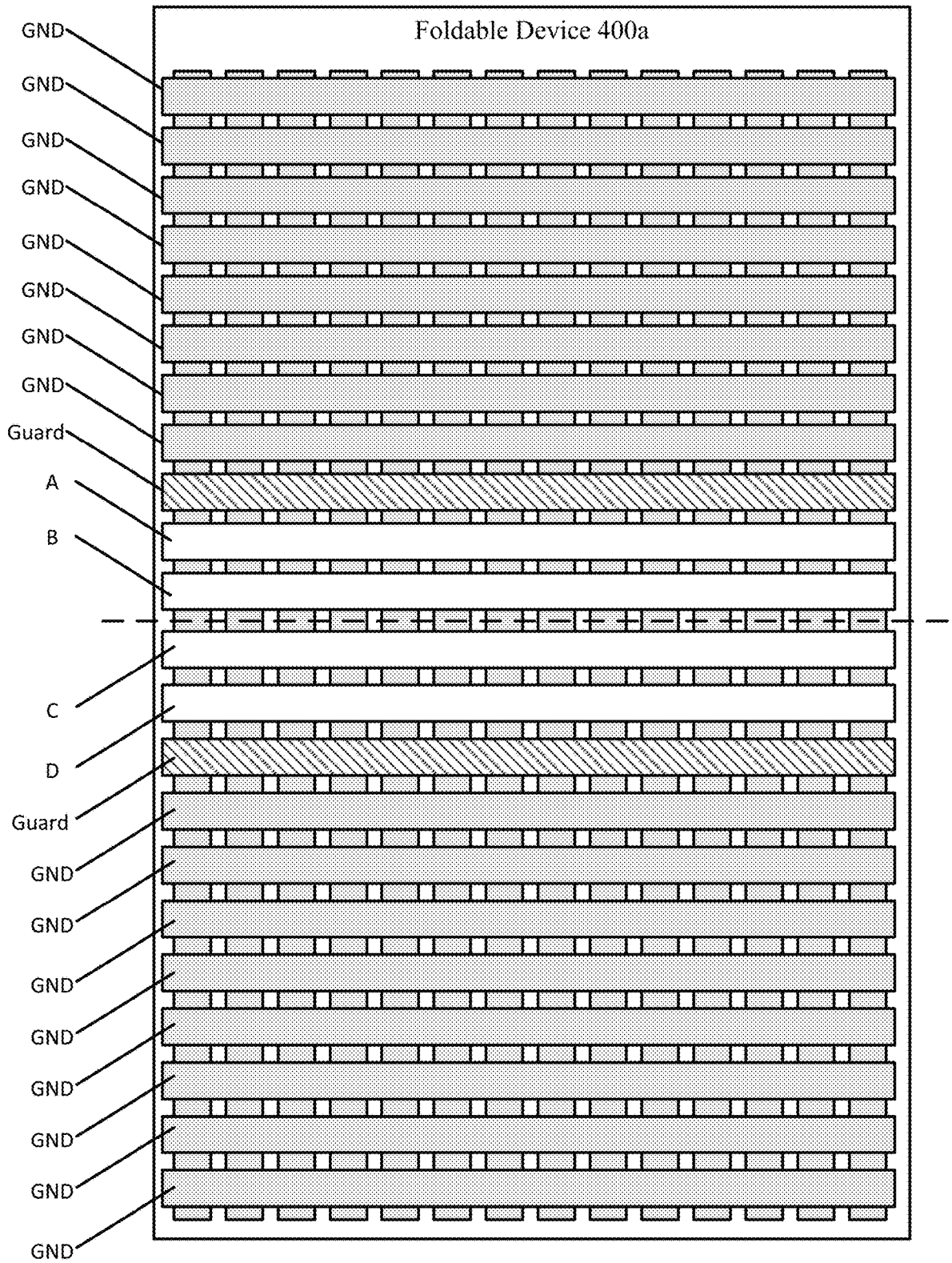
FIG. 7A depicts an example of a manner of operating a capacitive sensor array in accordance with an exemplary embodiment of the present disclosure.

FIG. 7A depicts an example of a manner of operating a capacitive sensor array in accordance with an exemplary embodiment of the present disclosure to obtain absolute capacitance measurements used for determining a fold angle. In this example, electrodes B and C are affected by bending, whereas the other horizontal electrodes are not affected (or less affected) by bending. In operating the capacitive sensor array shown in FIG. 7A in accordance with the process shown in FIGS. 5A-5B, at stage 502, absolute capacitance measurements are obtained from each of electrodes A, B, C and D, and these absolute capacitance measurements are compared to reference baseline measurements corresponding to a known fold angle. For example, respective $\Delta C_{bA}$, $\Delta C_{bB}$, $\Delta C_{bC}$ and $\Delta C_{bD}$ values are determined based on the differences between the obtained absolute capacitance measurements for each electrode and baseline reference measurements obtained for each electrode. The folding signal for determining a fold angle may be, for example, calculated as $\Delta C_{bB}+\Delta C_{bC}-\Delta C_{bA}-\Delta C_{bD}$ at stage 504a (a shorthand way to refer to this $\Delta C_{bB}+\Delta C_{bC}-\Delta C_{bA}-\Delta C_{bD}$ calculation used below is "BCAD"). Since the bending of the foldable device only affects electrodes B and C (or affects electrodes B and C to a greater extent than electrodes A and D), $\Delta C_{bB}$ and $\Delta C_{bC}$ carry the signal indicative of the fold angle, whereas $\Delta C_{bA}$ and $\Delta C_{bD}$ are used to cancel out common interference factors such as display noise and temperature drift. In a situation where there is no interference at all and electrodes A and D are not affected by the bending, $\Delta C_{bA}$ and $\Delta C_{bD}$ would both be 0, because electrodes A and D are not affected by the bending and are also not affected by any other interference.

The baseline reference measurements obtained for each of electrodes A, B, C and D may be obtained, for example, when the foldable device is at a known fold angle (e.g., fully closed or open flat), such that the $\Delta C_{bA}$, $\Delta C_{bB}$, $\Delta C_{bC}$ and $\Delta C_{bD}$ values reflect the change in fold angle relative to the known fold angle. These baseline reference measurements may be obtained, for example, during runtime of the foldable device. For example, when the foldable device is in a closed state and is being powered on, baseline reference measurements may be obtained corresponding to a known fold angle of 0° as part of a calibration operation performed during the power-on process (the foldable device may detect that it is in the closed state and thereby determine the fold angle of 0° during power-on, for example, by utilizing parallel transcapacitive sensing). To provide another example, for a foldable device which also has a Hall or IR or magnet sensor for detecting closure, baseline reference measurement may be obtained when the closure sensor detects that the foldable device is in the closed state (fold angle of 0°). It will be appreciated that baseline reference measurements for the absolute capacitance sensing-based manner of determining a fold angle may be taken or updated at various points during operation of the foldable device, and it may be advantageous to take or update such baseline reference measurements upon detection of a closed state (fold angle of 0°).

In an exemplary embodiment, the baseline reference measurements for the absolute capacitance measurements used for determining the fold angle may be set (or "locked") upon the foldable device being changed from the closed state to the open state. To avoid situations where opening the foldable device quickly results in an inaccurate baseline being taken, baseline reference measurements may be taken and buffered while the foldable device is in the closed state. Then, upon the foldable device being opened, the baseline reference measurements may be set (or "locked") to the baseline reference measurements which are stored in the buffer corresponding to a predetermined amount of time before the foldable device is detected as being opened (e.g., 0.5 s-1 s before the foldable device is detected as being opened).

To get from the BCAD calculation to the fold angle, the processing system may further utilize a constant k, whereby the constant k is calibrated during production of the foldable device. Given that the relationship between a change in fold angle and a corresponding change in absolute capacitance measurements for a sensor electrode whose dimensions are changed by bending is linear, the constant k may correspond to an expected capacitance change per one degree of folding. For example, the current fold angle of the foldable device may be determined by the processing system as being $\theta+((\Delta C_{bB}+\Delta C_{bC}-\Delta C_{bA}-\Delta C_{bD})/k)$, where $\theta$ is the known fold angle corresponding to the baseline reference measurements used to determine $\Delta C_{bA}$, $\Delta C_{bB}$, $\Delta C_{bC}$ and $C_{bD}$. k may be calculated, for example, by determining a first $\Delta C_{bB}+\Delta C_{bC}-\Delta C_{bA}-\Delta C_{bD}$ value at a first known fold angle and a second $\Delta C_{bB}+\Delta C_{bC}-\Delta C_{bA}-\Delta C_{bD}$ value at a second known fold angle, and then dividing the difference between the first and second $\Delta C_{bB}+\Delta C_{bC}-\Delta C_{bA}-\Delta C_{bD}$ values by the difference between the first and second known fold angles. It will be appreciated that, in an exemplary implementation using integer arithmetic instead of floating point, round-off errors may be avoiding by upscaling k, in which case the stored k value may reflect the change in capacitance between the two known fold angles multiplied by an upscale factor x, in which case the current fold angle of the foldable device may be determined by the processing system as being $0+x*((\Delta C_{bB}+\Delta C_{bC}-\Delta C_{bA}-\Delta C_{bD})/k)$. For example, if the upscaling factor x is 180 and the known fold angle corresponding to the baseline reference measurements $\theta$ is 180°, the formula used for calculating the fold angle may be $180°+180*((\Delta C_{bB}+\Delta C_{bC}-\Delta C_{bA}-\Delta C_{bD})/k)$.

In certain exemplary embodiments, multiple sets of baseline reference measurements corresponding to multiple respective known fold angles may be obtained, and the processing system may, for example, determine multiple sets of $\Delta C_{bA}$, $\Delta C_{bB}$, $\Delta C_{bC}$ and $\Delta C_{bD}$ values and multiple folding signals to determine multiple calculated fold angles, with a final output fold angle being based on an average of the multiple calculated fold angles.

In an alternative exemplary embodiment, the processing system may determine the fold angle without relying on change in capacitance values. For example, during production, a foldable device may be calibrated such that $\Delta C_{bB}+\Delta C_{bC}-\Delta C_{bA}-\Delta C_{bD}$ values are obtained for a plurality of folding states (e.g., one $\Delta C_{bB}+\Delta C_{bC}-\Delta C_{bA}-\Delta C_{bD}$ value for every degree from 0° to 360°), and a lookup table is stored by the processing system which includes a mapping between respective $\Delta C_{bB}+\Delta C_{bC}-\Delta C_{bA}-\Delta C_{bD}$ values and respective fold angles. In this alternative exemplary embodiment, at stage 502, a set of $\Delta C_{bA}$, $\Delta C_{bB}$, $\Delta C_{bC}$ and $\Delta C_{bD}$ measurements are obtained, and at stage 504a, a $\Delta C_{bB}+\Delta C_{bC}-\Delta C_{bA}-\Delta C_{bD}$ value is determined and mapped to a respective fold angle based on the lookup table. In this alternative exemplary embodiment, the lookup table may further be calibrated during runtime, for example, by utilizing a runtime measurement at a known angle to adjust the entry in the lookup table corresponding to that respective angle, and then applying the same adjustment to all other entries in the lookup table.

With regard to display noise, it has been demonstrated through display noise testing that the display noise for electrodes A and D (i.e., $N_{DispA}$ and $N_{DispD}$) is approximately the same as the display noise for electrodes B and C (i.e., $N_{DispB}$ and $N_{DispC}$). Thus, calculating the folding signal as $\Delta C_{bB}+\Delta C_{bC}-\Delta C_{bA}-\Delta C_{bD}$ (or otherwise using a $\Delta C_{bB}+\Delta C_{bC}-\Delta C_{bA}-\Delta C_{bD}$ calculation) provides for cancelling out display noise.

Similarly, with regard to temperature drift, since electrodes A, B, C and D are close to one another, the temperature drift for these four electrodes will track each other closely. Thus, calculating the folding signal as $\Delta C_{bB}+\Delta C_{bC}-\Delta C_{bA}-\Delta C_{bD}$ (or otherwise using a $\Delta C_{bB}+\Delta C_{bC}-\Delta C_{bA}-\Delta C_{bD}$ calculation) provides for cancelling out the effects of temperature drift.

Calculating the folding signal as $\Delta C_{bB}+\Delta C_{bC}-\Delta C_{bA}-\Delta C_{bD}$ (or otherwise using a $\Delta C_{bB}+\Delta C_{bC}-\Delta C_{bA}-\Delta C_{bD}$ calculation) further provides for cancelling out effects of Analog Display Noise Suppression (ADNS), as ADNS is applied as an offset to all four of the electrodes in the same manner. Further, exemplary embodiments of the present disclosure are immune to a low ground mass (LGM) condition, as $C_b$ measurements are not affected by the grounding condition.

As shown in FIG. 7A, while obtaining the absolute capacitance measurements at stage 502, the immediate neighbors above and below the four electrodes under measurement are guarded, and all other horizontal electrodes are grounded. Additionally, all vertical electrodes are grounded. The guarding of the two electrodes bordering the portion of the sensor array under measurements may provide for the signal levels of the resulting signals obtained via electrodes A and D to be comparable to the signal levels of the resulting signals obtained via electrodes B and C (that is, without the guarding, the measurements obtained via electrodes A and D may be at a higher signal level than the measurements obtained via electrodes B and C). The grounding of most of the electrodes of the sensor array provides for significantly reduced touch-to-display coupling. That is, since only 6 row electrodes out of the entire array are being driven (two being driven with a guard signal and four being driven for measurement), display artifacts are minimized or avoided. Further, the maximum driving voltage for absolute capacitance sensing is relatively low (e.g., 2 Vpp for absolute capacitance sensing relative to 9 Vpp for transcapacitance sensing), the total touch-to-display coupling while performing fold detection is relatively small (e.g., ~33% less than performing transcapacitive sensing with CDM row-sum of "1"). Additionally, grounding and/or guarding the row electrodes prevents input object(s) (e.g., such as finger(s)) that are disposed away from the hinge area from affecting the capacitive responses detected in the hinge area.

Further, it will be appreciated that because absolute capacitance sensing is used in connection with FIG. 7A, the fold detection can be performed in an asynchronized mode relative to operation of the display. This allows for avoiding a baseline shift issue with regard to a low-temperature polycrystalline oxide (LTPO)/hybrid-oxide and polycrystalline (HOP) panel and for avoiding a display image-dependency problem.

It will be appreciated that although FIG. 7A is depicted using foldable device 400a from FIG. 4A, which has a bars-and-stripes sensor array pattern, exemplary embodiments of the disclosure may use different sensor array patterns. For example, the sensor MM layer of a foldable device may include sensor electrodes in a diamond pattern, a metal mesh pattern for minimizing light scatter, or other sensor electrode patterns.

It will be appreciated that although FIG. 7A is depicted using foldable device 400a from FIG. 4A, the principles discussed herein may also be applied to the foldable device 400b from FIG. 4B. For example, absolute capacitance measurements from one or more sensing pads 412 from the row immediately above the fold line may be used to determine a $\Delta C_{bB}$ value, and absolute capacitance measurements from one or more sensing pads 412 from the row immediately below the fold line may be used to determine a $\Delta C_{bC}$ value. Similarly, one or more sensing pads 412 from the second row above the fold line may be used to determine a $\Delta C_{bA}$ value, and absolute capacitance measurements from one or more sensing pads 412 from the second row below the fold line may be used to determine a $\Delta C_{bD}$ value. Additionally, sensing pads 412 surrounding the sensing pads 412 under measurement may be guarded, and all other sensing pads 412 may be grounded.

It will be appreciated that the $\Delta C_b$ readings for electrodes A and D are expected to be similar, such that in an alternative embodiment, instead of a BCAD formula, the processing system may use only one of $\Delta C_{bA}$ or $\Delta C_{bD}$ to determine the fold angle. That is, at stage 504a, the processing system may determine the fold angle of the foldable device based on $\Delta C_{bB}+\Delta C_{bC}-2*\Delta C_{bA}$ or $\Delta C_{bB}+\Delta C_{bC}-2*\Delta C_{bD}$.

A comparison between results from a model operating to detect a fold angle based on a "BC" signal ($\Delta C_{bB}+\Delta C_{bC}$), and one operating to detect a fold angle based on a "BCAD" signal ($\Delta C_{bB}+\Delta C_{bC}-\Delta C_{bA}-\Delta C_{bD}$) can demonstrate potential effectiveness of exemplary embodiments of the present disclosure. For example, both the BC and BCAD signals showed good signal levels and linearity under similar conditions when the foldable device under test slowly rotates from open position to a 90° bend and then from a 90° bend to a closed position. On the other hand, the display noise was significantly reduced for the BCAD signal relative to the BC signal when a noisy image (Zebra H55) was applied at a fixed open angle to the foldable device. Note that the BCAD implementation may not require filtering to reduce display noise, but light filtering can be applied to further reduce display noise, preferably without introducing undesirable latency.

By applying heat to the foldable device (at a fixed angle) from ~25° C. to ~45° C. followed by cooling the foldable device back to ~25° C., the effects of temperature drift on the detected fold angle for the BCAD implementation were significantly lower than for the BC implementation.

It will be appreciated that the BCAD example depicted and discussed above in connection with FIG. 7A is merely one exemplary implementation of the principles discussed herein, and that exemplary embodiments of the present disclosure are not limited thereto. As discussed above in connection with stage 502 of FIGS. 5A-5B, obtaining at least one absolute capacitance measurement from at least one sensor electrode whose dimensions are changed by bending at the fold line of the foldable device and at least one sensor electrode whose dimensions are unchanged (or minimally changed) by the bending of the foldable device may allow for capacitively detecting a fold angle of a foldable device in a manner that minimizes the effects of display noise, reduces errors caused by temperature drift, avoids image dependency, and minimizes touch-to-display coupling.

Figure 7B:
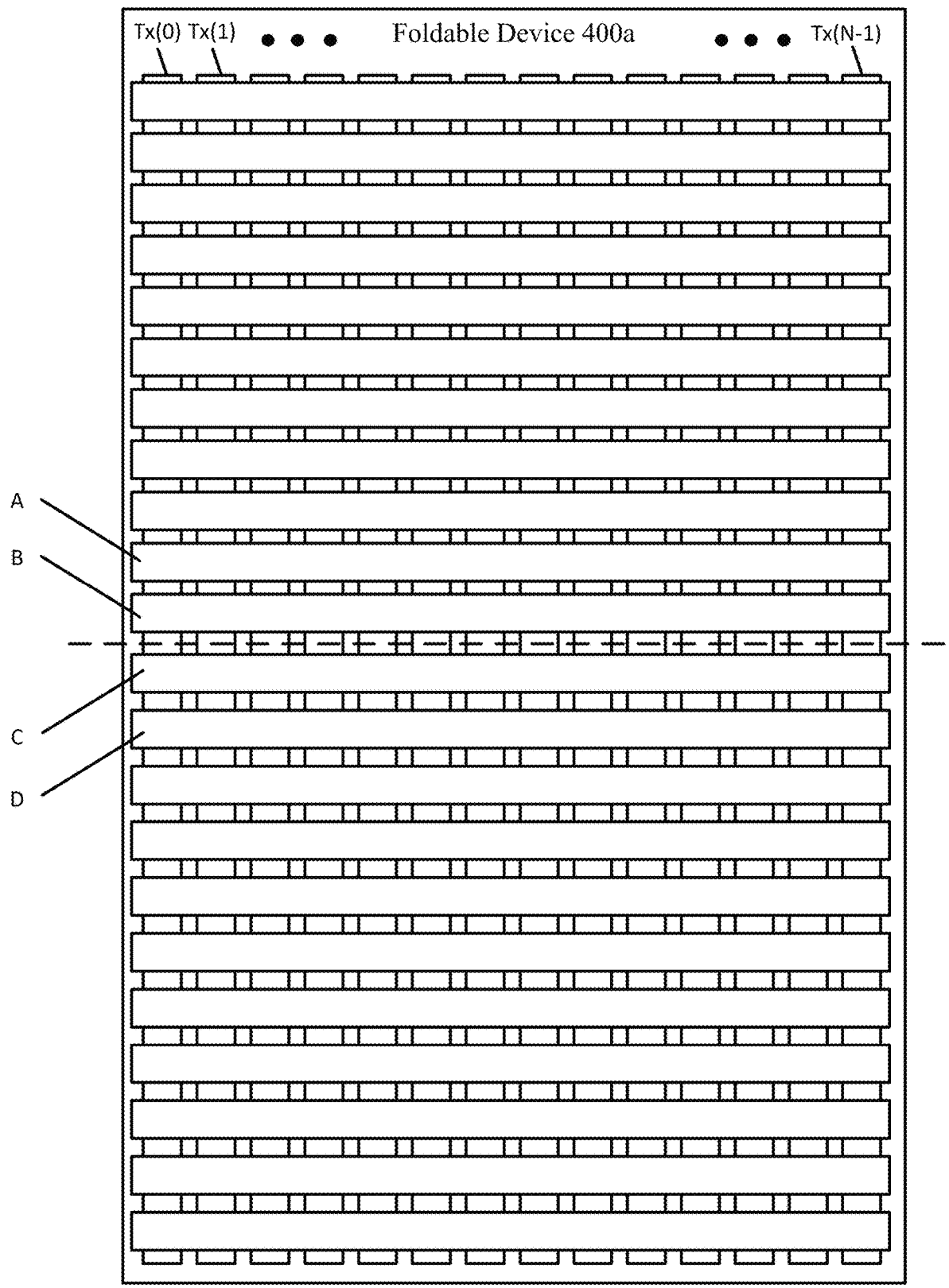
FIG. 7B depicts an example of a manner of operating a capacitive sensor array in accordance with an exemplary embodiment of the present disclosure.

FIG. 7B depicts an example of a manner of operating a capacitive sensor array in accordance with an exemplary embodiment of the present disclosure to obtain transcapacitance measurements used for touch sensing (and which are also usable to cancel out interference caused by a finger or other input object with respect to fold angle detection). In particular, FIG. 7B depicts the vertical touch sensing electrodes (Tx(0), Tx(1), ... Tx(N-1)) being used as transmitter electrodes and the horizontal electrodes being used as receiver electrodes to perform two-dimensional transcapacitive touch sensing, whereby each intersection of a respective transmitter electrode with a respective receiver electrodes corresponds to a touch pixel.

Touch sensing measurements with respect to the entire sensing array may be used for the purpose of determining presence and/or position of a finger or other input object in the sensing region corresponding to the sensing array, whereas for the purposes of cancelling out interference with respect to fold angle detection, a subset of the touch sensing measurements may be used. For example, one or more transcapacitive BCAD values may be determined based on determining the transcapacitance at each touch pixel for the B, C, A and D receiver electrodes. That is, a BCAD value for a respective transmitter electrode may be expressed as follows:

$$BCAD(i) = C_{BTx(i)} + C_{CTx(i)} - C_{ATx(i)} - C_{DTx(i)}$$

where $C_{BTx(i)}$ corresponds to the capacitance at the touch pixel at the cross-point between TX electrode Tx(i) and RX electrode B, $C_{CTx(i)}$ corresponds to the capacitance at the touch pixel at the cross-point between TX electrode Tx(i) and RX electrode C, $C_{ATx(i)}$ corresponds to the capacitance at the touch pixel at the cross-point between TX electrode Tx(i) and RX electrode A, and $C_{DTx(i)}$ corresponds to the capacitance at the touch pixel at the cross-point between TX electrode Tx(i) and RX electrode D.

The BCAD values for all the TX electrodes may then be summed to obtain a BCAD value corresponding to the entire width of the sensing region:

$$SumTransBCAD = \Sigma_{i=0}^{N-1} BCAD(i)$$

The "Sum TransBCAD" value represents a sum of transcapacitive BCAD values obtained from two-dimensional transcapacitive touch sensing measurements. Additionally, it will be appreciated that although this exemplary embodiment utilizes the sum of capacitance values for all transmitter electrodes from i=0 to i=N-1, in other exemplary embodiments, less than all transmitter electrodes may be utilized as well.

To cancel out interference from a finger or other input object that is present proximate to the hinge (e.g., proximate to any of RX electrodes A, B, C or D), this SumTransBCAD may be subtracted from the absolute capacitance BCAD value discussed above in connection with FIG. 7A (which may be referred to as "AbsBCAD"). Thus, determining the fold angle in accordance with stage 504b of FIG. 5B discussed above may be based on a hybrid capacitance value as follows:

$$C_{Hybrid} = AbsBCAD - \alpha * SumTransBCAD$$

where α is a scaling factor. In some examples, α may be set to be equal to 1.

It will be appreciated that baselining may also be performed for the $C_{BTx(i)}$, $C_{CTx(i)}$, $C_{ATx(i)}$ and $C_{DTx(i)}$ measurements, for example, while the foldable device is in the closed state, as two-dimensional transcapacitive measurements may similarly utilize baseline reference measurements for determination of a change in capacitance relative to the baseline reference measurements. Thus, transcapacitive baselining for the purposes of determining SumTransBCAD may be performed together with absolute capacitance baselining for the purposes of determining AbsBCAD as discussed above.

Figure 8:
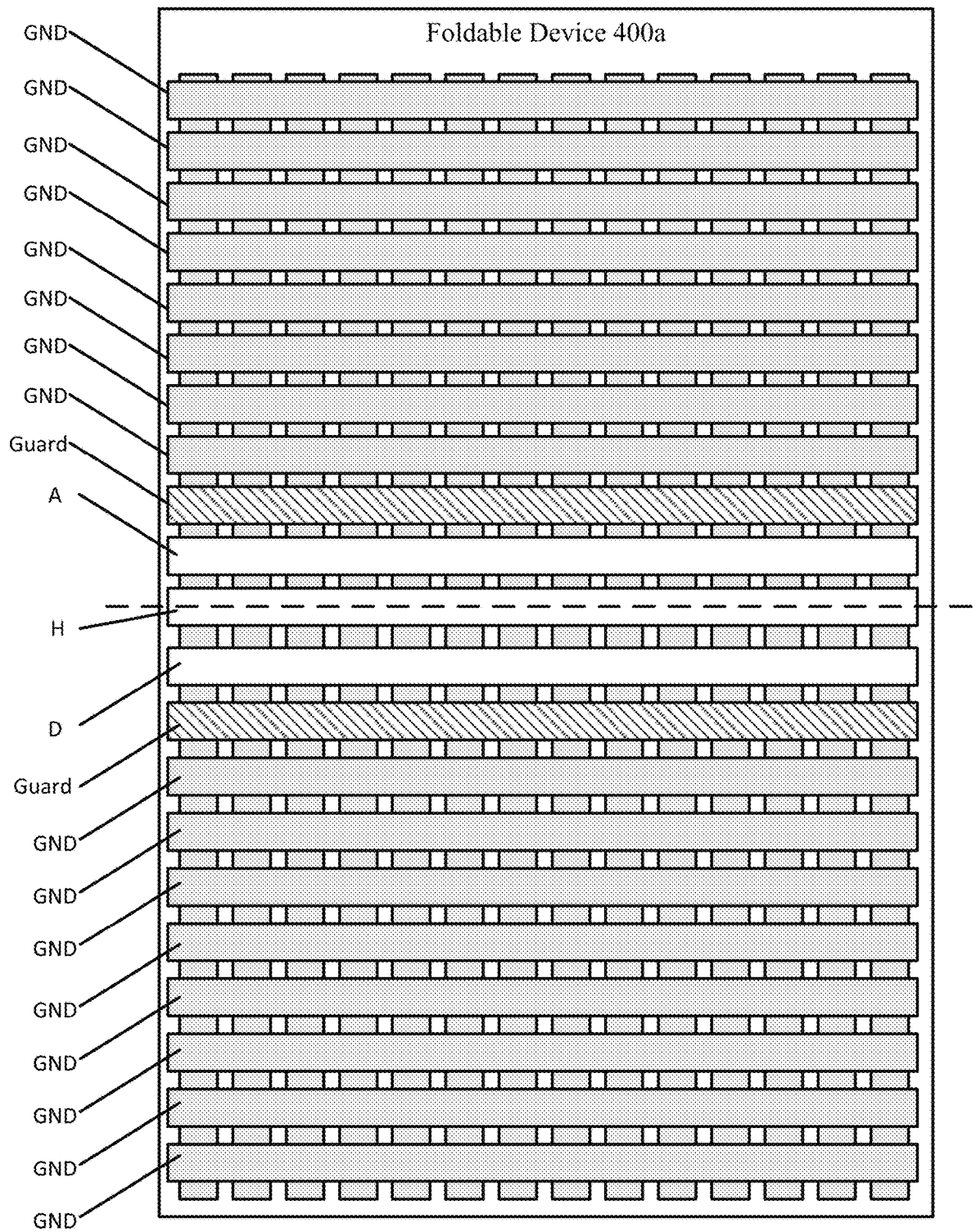
FIG. 8 depicts an example of a manner of operating a capacitive sensor array in accordance with another exemplary embodiment of the present disclosure.

FIG. 8 depicts an example of a manner of operating a capacitive sensor array in accordance with another exemplary embodiment of the present disclosure. In this example, the only horizontal electrode affected by bending is electrode H, whereas the other horizontal electrodes are not affected (or minimally affected) by bending. In operating the capacitive sensor array shown in FIG. 8 in accordance with the process shown in FIGS. 5A-5B, at stage 502, absolute capacitance measurements are obtained from each of electrodes A, H and D, and respective $\Delta C_{bA}$, $\Delta C_{bH}$, and $\Delta C_{bD}$ values are determined. The folding signal for determining a fold angle is then calculated as $2*\Delta C_{bH} - \Delta C_{bA} - \Delta C_{bD}$ at stage 504a. Since the bending of the foldable device only affects electrode H, $\Delta C_{bH}$ carries the signal indicative of the fold angle, whereas $\Delta C_{bA}$ and $\Delta C_{bD}$ are used to cancel out common interference factors such as display noise and temperature drift.

It will be appreciated that the principles discussed above with respect to stage 504b of FIG. 5B are also applicable to exemplary embodiment shown in FIG. 8. For example, $2*\Delta C_{bH} - \Delta C_{bA} - \Delta C_{bD}$ may be considered as "AbsHAD" in this case, and a "SumTransHAD" value may be determined at stage 504b using touch sensing measurements obtained at stage 501. Thus, at stage 504b, the processing system may calculate a $C_{Hybrid}$ value of $AbsHAD - \alpha*SumTransHAD$ to determine the fold angle in a manner that is not affected by interference from a finger or other input object.

Figure 9:
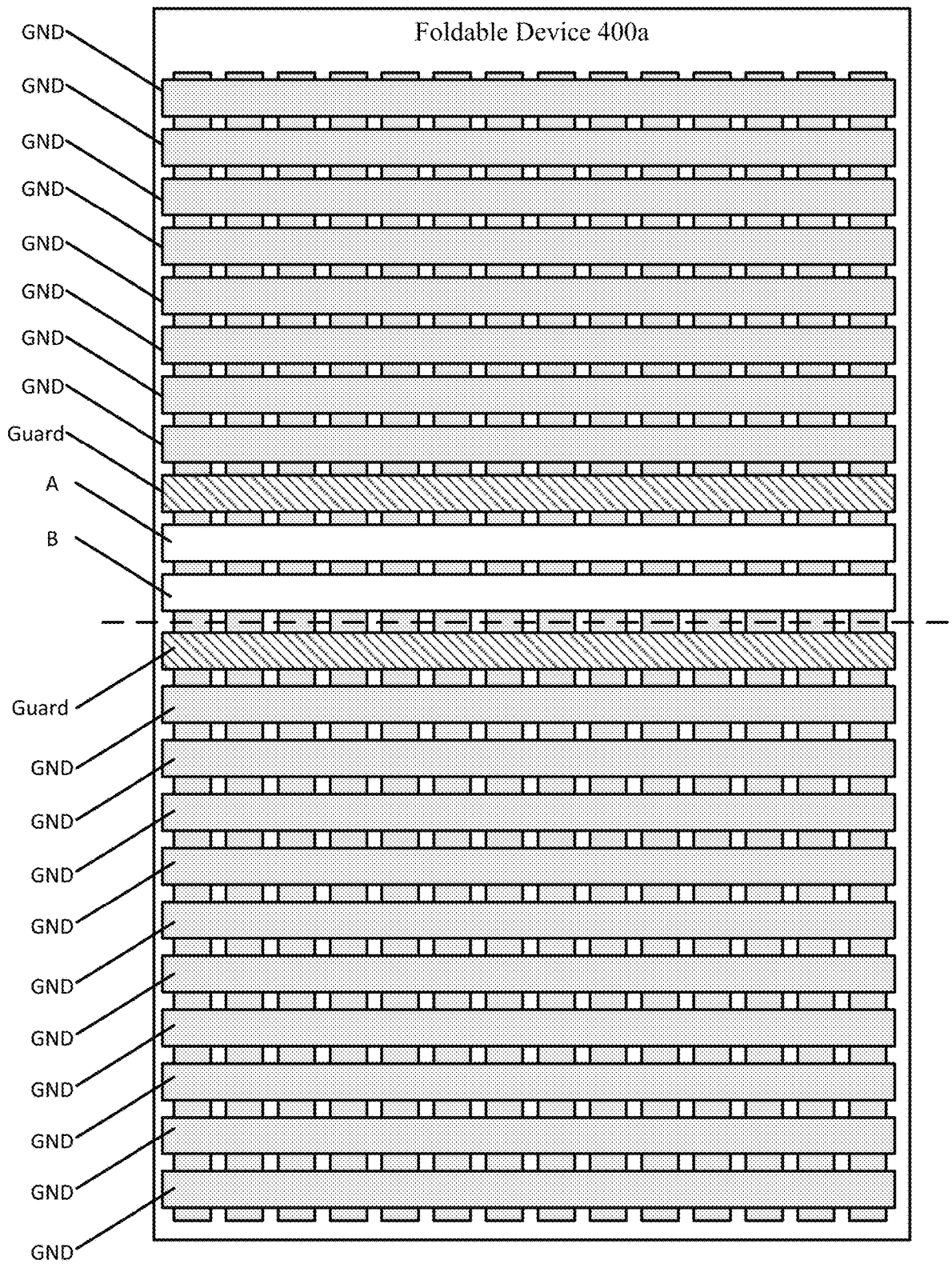
FIG. 9 depicts an example of a manner of operating a capacitive sensor array in accordance with yet another exemplary embodiment of the present disclosure.

FIG. 9 depicts an example of a manner of operating a capacitive sensor array in accordance with yet another exemplary embodiment of the present disclosure. In this example, the only horizontal electrode under measurement which is affected by bending is electrode B, and electrode A which is also under measurement is not affected (or minimally affected) by bending. In operating the capacitive sensor array shown in FIG. 9 in accordance with the process shown in FIGS. 5A-5B, at stage 502, absolute capacitance measurements are obtained from each of electrodes A and B, and respective $\Delta C_{bA}$ and $\Delta C_{bB}$ values are determined. The folding signal for determining a fold angle is then calculated as $\Delta C_{bB} - \Delta C_{bA}$ at stage 504a. Since the bending of the foldable device affects electrode B but not electrode A, $\Delta C_{bB}$ carries the signal indicative of the fold angle, whereas $\Delta C_{bA}$ is used to cancel out common interference factors such as display noise and temperature drift.

It will be appreciated that the principles discussed above with respect to stage 504b of FIG. 5B are also applicable to exemplary embodiment shown in FIG. 9. For example, $\Delta C_{bB} - \Delta C_{bA}$ may be considered as "AbsBA" in this case, and a "SumTransBA" value may be determined at stage 504b using touch sensing measurements obtained at stage 501. Thus, at stage 504b, the processing system may calculate a $C_{Hybrid}$ value of AbsBA−α*SumTransBA to determine the fold angle in a manner that is not affected by interference from a finger or other input object.

Figure 10A:
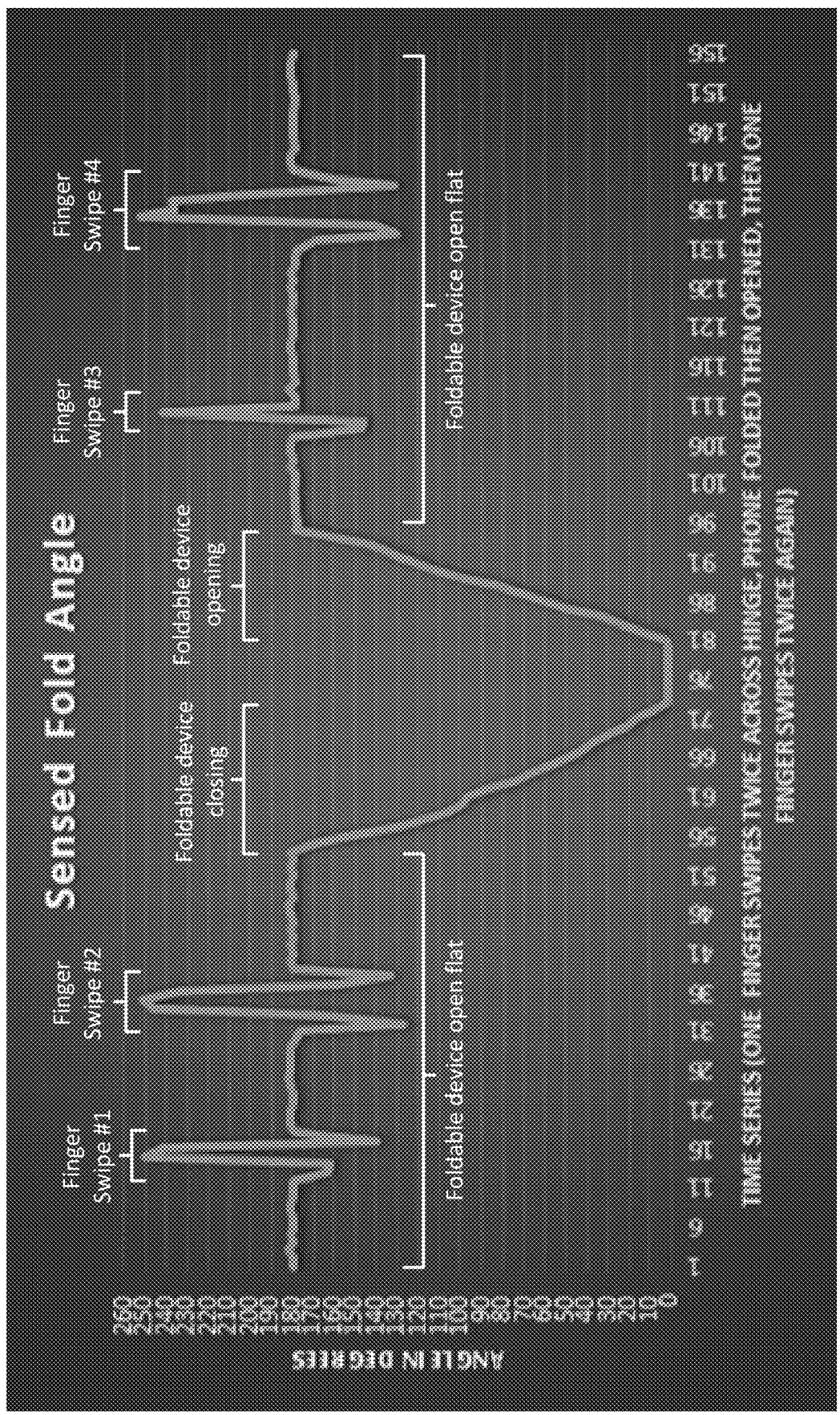
FIGS. 10A-10B are plots that show the working principles of how interference from a finger or other input object is cancelled out using transcapacitance measurements in accordance with an exemplary implementation of the present disclosure.
Figure 10B:
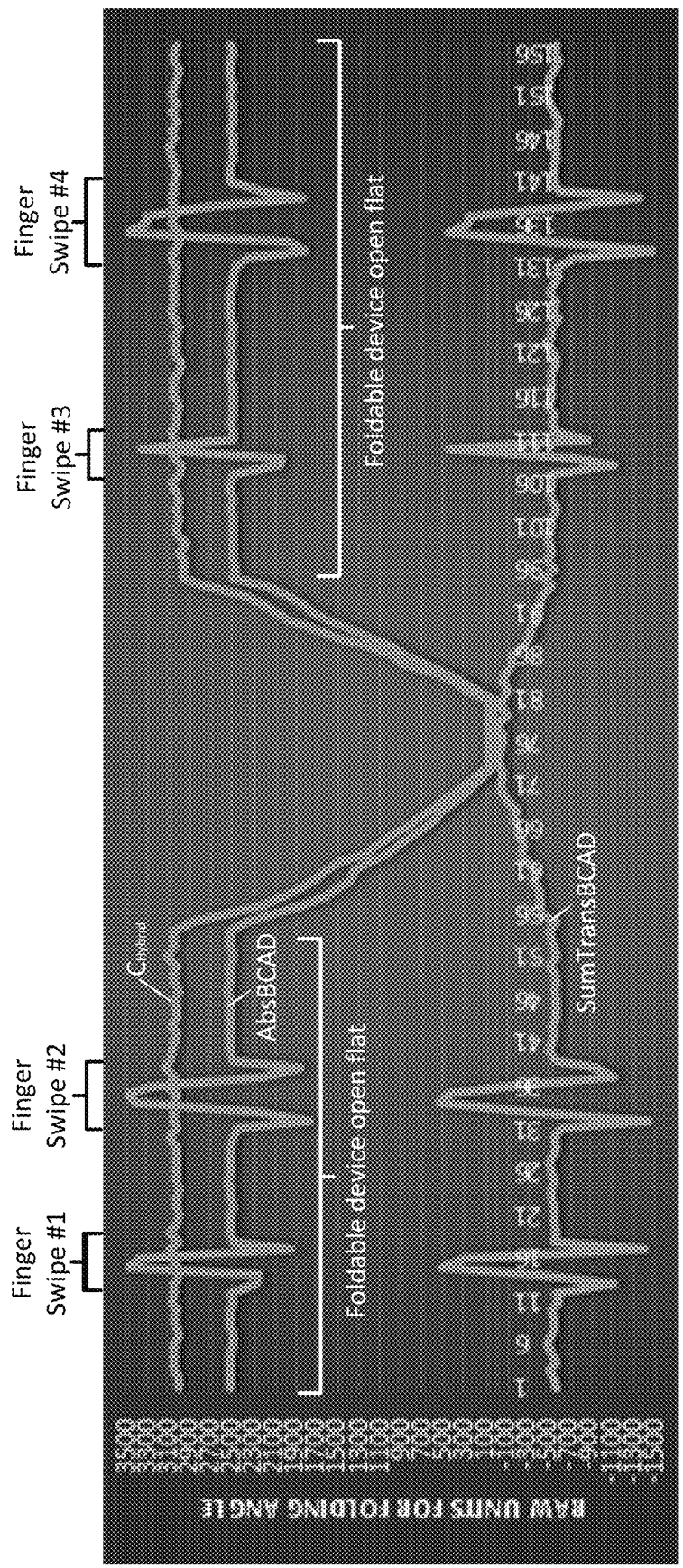

FIGS. 10A-10B are plots that show the working principles of how interference from a finger or other input object can be cancelled out using transcapacitance measurements in accordance with an exemplary implementation of the present disclosure. FIG. 10A, in particular, illustrates an example of the problem of interference from a finger when determining a fold angle based on AbsBCAD measurements alone. As shown in FIG. 10A, the foldable device is open flat for a certain time period (e.g., from 0 time units to around 54 time units), followed by the foldable device being closed (e.g., the act of transitioning from the open flat state to the fully closed state spans from approximately the $54^{th}$ time unit to the $72^{nd}$ time unit), followed by the foldable device being opened (e.g., the act of transitioning from the fully closed state to the open flat state spans from approximately the $81^{st}$ time unit to the $93^{rd}$ time unit), followed by the foldable device remaining in the open flat state (from the $93^{rd}$ time unit to the $156^{th}$ time unit). While the foldable device is open flat, an object (e.g., a finger in this example) was swiped over the sensor electrodes near the hinge of the foldable device which are used for determining the fold angle four times, resulting in object-related interference causing inaccuracies in the detection of the fold angle. In particular, it can be seen from FIG. 10A that while the foldable device is open flat, the detection of the fold angle as being 180° in this exemplary implementation is quite accurate except when the object-related interference is present, and the interference may introduce a detection error, in this example, in the range of approximately −50° to +70°.

FIG. 10B illustrates how SumTransBCAD values may be utilized to cancel out object-related interference present in AbsBCAD measurements. In particular, as can be seen on the AbsBCAD plot line, when the foldable device is open flat (corresponding to a fold angle of 180°), the signal level for AbsBCAD corresponds to around 2500 units, with fluctuations ranging from about −800 to +1000 caused by object-related interference. On the SumTransBCAD plot line, when the foldable device is open flat, the signal level for SumTransBCAD corresponds to around −500 units, with fluctuations of similar shape ranging from about −1000 to +1000 caused by object-related interference. Thus, when the SumTransBCAD value and the AbsBCAD value are both taken into account (e.g., through subtracting one from the other) to obtain a $C_{Hybrid}$ value, the object-related interference is generally cancelled out, leaving a mostly flat line at a signal level of around 3000 units corresponding to the foldable device being open flat. Additionally, since both the AbsBCAD and SumTransBCAD values change proportionally with fold angle (both plots have a linear slope when transitioning from open to closed and closed to open at a steady rate), the $C_{Hybrid}$ value provides an accurate basis for determining fold angle at all fold angles from 180° to 0°.

It will be appreciated that, when using $C_{Hybrid}$ to determine a fold angle (e.g., at stage 504b of FIG. 5B) as opposed to using AbsBCAD to determine a fold angle (e.g., at stage 504a of FIG. 5A), the correspondence between the determined signal level and the fold angle may be calibrated differently—e.g., when using AbsBCAD, a signal level range of around 0 to 2500 corresponds to fold angles of 0° to 180°, and when using $C_{Hybrid}$, a signal level range of around 0 to 3000 corresponds to fold angles of 0° to 180°.

Additionally, it will be appreciated that, in the exemplary implementation depicted in FIG. 10B, the scaling factor α for determining $C_{Hybrid}$ may be set to 1 because the object-related fluctuations in SumTransBCAD are approximately of the same magnitude as the object-related fluctuations in AbsBCAD. In other exemplary implementations, the scaling factor α for determining $C_{Hybrid}$ may be set to a different value (e.g., if the object-related fluctuations in SumTransBCAD are larger than the object-related fluctuations in AbsBCAD, the scaling factor α may correspondingly be smaller than 1, and if the object-related fluctuations in SumTransBCAD are smaller than the object-related fluctuations in AbsBCAD, the scaling factor α may correspondingly be greater than 1).

It will further be appreciated that although the discussion above with regard to FIGS. 10A-10B refers back to the "BCAD" embodiment discussed in connection with FIGS. 7A-7B, the principles discussed therein are also applicable to the "HAD" and "BA" embodiments of FIGS. 8-9, as well as other exemplary embodiments.

Figure 11A:
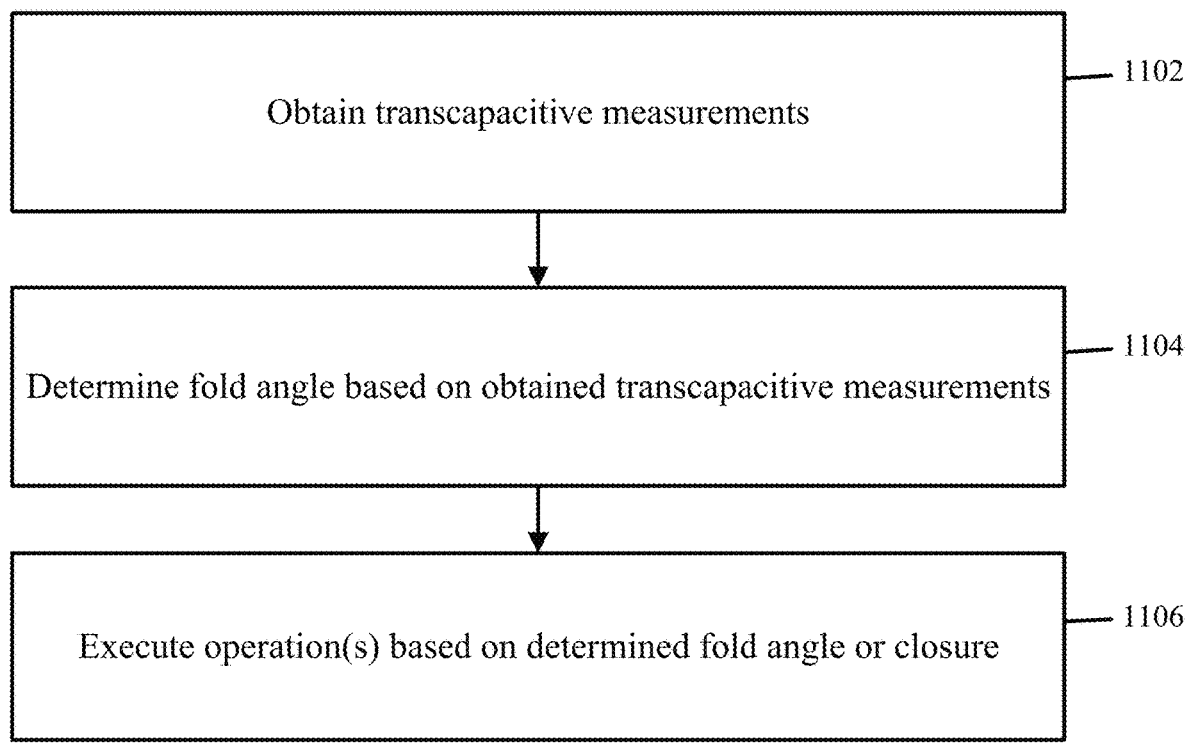
FIG. 11A is a flowchart of an exemplary processes for capacitively determining a fold angle of a foldable device in accordance with an exemplary embodiment of the present disclosure.

In an alternate exemplary embodiment of the present disclosure, transcapacitive measurements on their own may be used to determine a fold angle of a foldable device. FIG. 11A depicts an exemplary process 1100 for such a determination. At stage 1102, two-dimensional transcapacitive measurements are obtained by a processing system of the foldable device via receiver electrodes proximate to a hinge of the foldable device, for example, in the manner discussed above with respect to FIG. 7B (i.e., on receiver electrodes BCAD). These transcapacitive measurements may be obtained, for example, as part of a touch sensing operation or in a separate sensing step relative to the touch sensing operation. At stage 1104, a SumTransBCAD value is determined by the processing system, for example, in the manner discussed above in connection with FIG. 7B, and the SumTransBCAD value is used on its own to determine a corresponding fold angle (e.g., as can be seen in FIG. 10B, the signal level for SumTransBCAD is proportional to the fold angle). Then, at stage 1106, the processing system (or another processor of the foldable device) executes one or more operations based on the determined fold angle (for example, as discussed above in connection with stage 506 of FIG. 5A).

In a further exemplary embodiment, the process 1100 of FIG. 11A may be modified to reduce or avoid interference from a finger or other input object by obtaining transcapacitive measurements at stage 1102 only for touch pixels where the finger or other input object is not present. For example, if a finger 240b is present on touch pixels corresponding to transmitter electrodes Tx(0) and Tx(1), the SumTransBCAD value determined at stage 1104 may be based on BCAD values corresponding to transmitter electrodes other than Tx(0) and Tx(1). For example, in this case, SumTransBCAD may be calculated as $\Sigma_{i=2}^{N-1} BCAD(i)$ to avoid interference from the finger 240b.

It will further be that although the discussion above with regard to FIGS. 11A-11B refers back to the "BCAD" embodiment discussed in connection with FIGS. 7A-7B, the principles discussed therein are also applicable to the "HAD" and "BA" embodiments of FIGS. 8-9, as well as other exemplary embodiments.

In some embodiments, detecting whether a finger is present proximate to the hinge of a foldable device (e.g., with respect to stage 510 of FIG. 5C) may be performed via conventional transcapacitive touch sensing and/or absolute capacitance touch sensing. However, there may be some situations where conventional touch sensing measurements taken when the foldable device is folded may not be readily distinguishable from conventional touch sensing measurements corresponding to a finger being present proximate to the hinge of the foldable device. As such, in some further embodiments, detecting whether a finger is present proximate to the hinge of a foldable device may be performed in a different manner using transcapacitive measurements, such as BCAD, HAD or BA measurements (e.g., for stage 510 of FIG. 5C).

Figure 11B:
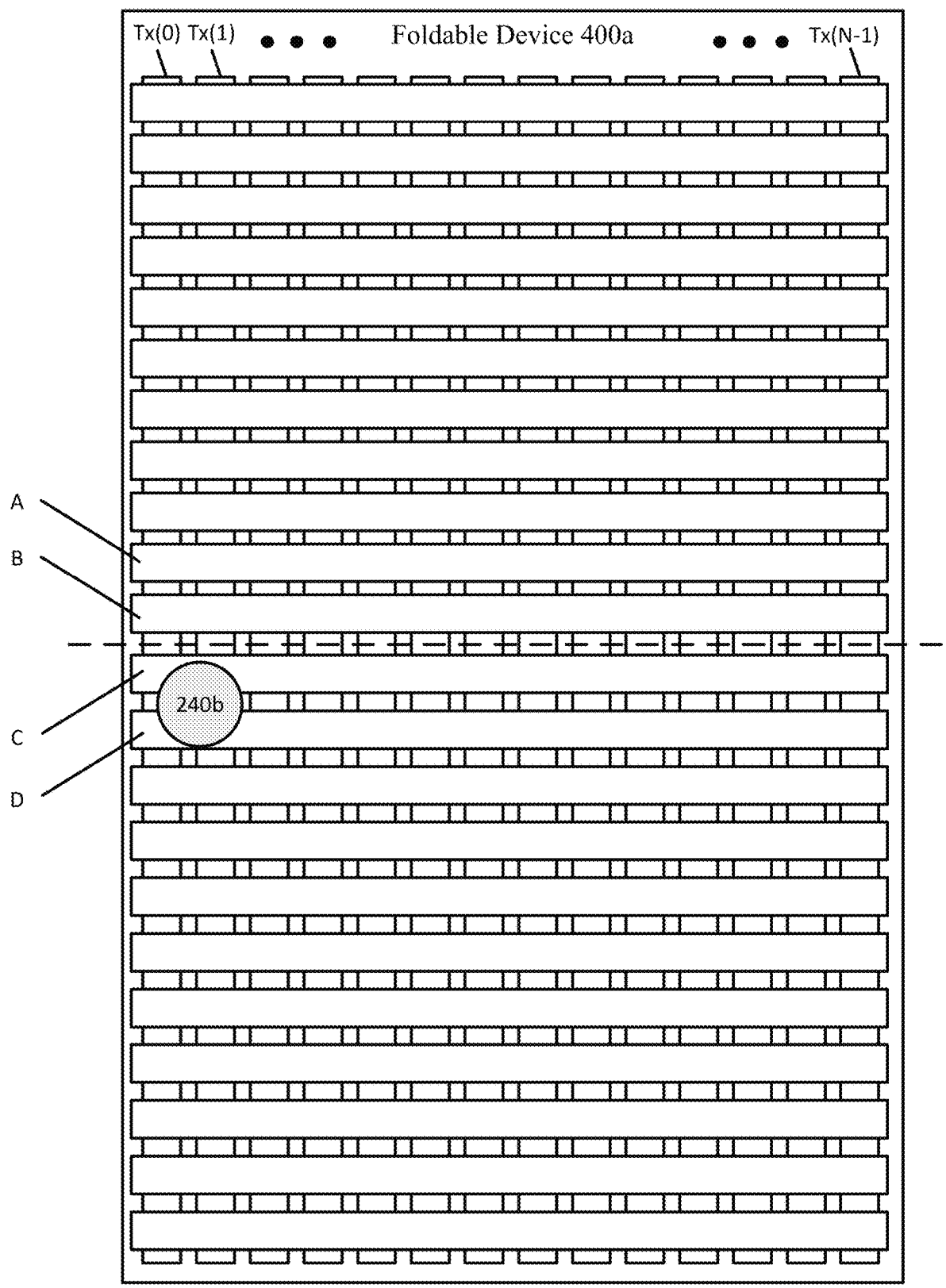
FIG. 11B depicts an example of a manner of operating a capacitive sensor array in accordance with an exemplary embodiment of the present disclosure.

To give an example with respect to using transcapacitive BCAD measurements to detect whether a finger is present proximate to the hinge of a foldable device, reference may be made to FIG. 11B, which shows N Tx electrodes (Tx(0) through Tx(N-1)) with respective transcapacitive cross-points with each of Rx electrodes A, B, C and D. As discussed above, a BCAD value for a respective transmitter electrode may be expressed as follows:

$$BCAD(i) = C_{BTx(i)} + C_{CTx(i)} - C_{ATx(i)} - C_{DTx(i)}$$

where $C_{BTx(i)}$ corresponds to the capacitance at the touch pixel at the cross-point between TX electrode Tx(i) and RX electrode B, $C_{CTx(i)}$ corresponds to the capacitance at the touch pixel at the cross-point between TX electrode Tx(i) and RX electrode C, $C_{ATx(i)}$ corresponds to the capacitance at the touch pixel at the cross-point between TX electrode Tx(i) and RX electrode A, and $C_{DTx(i)}$ corresponds to the capacitance at the touch pixel at the cross-point between TX electrode Tx(i) and RX electrode D.

If a finger is not present, the variance between a minimum BCAD(i) value and a maximum BCAD(i) value from among the Tx electrodes (from i=0 to i=N-1) will be relatively low, whereas if a finger is present at the hinge, the variance between a minimum BCAD(i) value and a maximum BCAD (i) value from among the Tx electrodes (from i=0 to i=N-1) will be relatively high. The minimum and maximum BCAD (i) values may be expressed as follows:

$$MaxBCAD = max(BCAD(i)), i=0,1, \ldots, N-1$$

$$MinBCAD = min(BCAD(i)), i=0,1, \ldots, N-1$$

A threshold (ThFinger) may thus be set for the difference between the maximum BCAD(i) value and the minimum BCAD(i) value which is indicative of whether a finger is present proximate to the hinge. That is, in the case of (MaxBCAD−MinBCAD)>ThFinger, a finger (or other input object) may be determined as being present proximate to the hinge of the foldable device.

It will be appreciated that although the foregoing example uses transcapacitive BCAD measurements for MaxBCAD and MinBCAD, the principles discussed in connection therewith also apply to other embodiments, such as HAD or BA embodiments (which may analogously use MaxHAD and MinHAD or MaxBA and MinBA).

In view of the foregoing, it will be appreciated that exemplary embodiments of the present disclosure are able to minimize the effects of display noise, reduce errors caused by temperature drift, avoid image dependency, and minimize touch-to-display coupling so as to provide a viable and accurate manner of capacitively detecting a fold angle of a foldable device. Further, exemplary embodiments of the present disclosure achieve various advantages relative to conventional foldable devices—including, but not limited to, reduction in bill of material (BOM) costs, assembly labor, simplification of product design, avoidance of interference to the display caused by magnetic switch, improved reliability (a statistical side effect of fewer parts), etc. Additionally, exemplary embodiments of the present disclosure are able to accurately determine fold angle even when a finger (or other input object) is present near a hinge of a foldable device.

Figure 12:
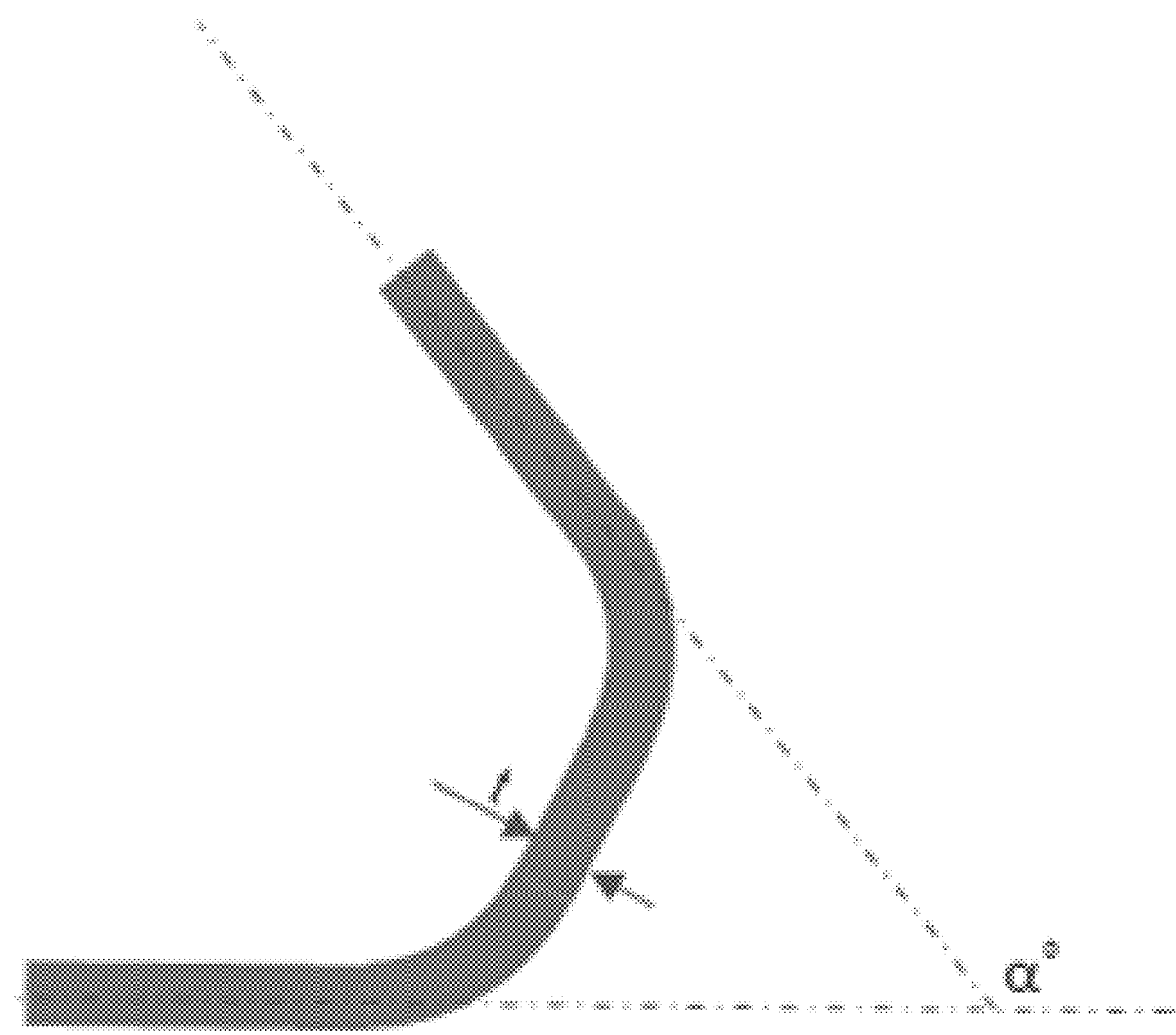
FIG. 12 depicts an example of a double-hinge foldable device in a folded state corresponding to a fold angle of 180°-α°.

It will be appreciated that the exemplary depiction above in FIGS. 6A-6B show a fold for a single-hinge foldable device, but the principles discussed herein are not limited thereto. For example, the principles discussed herein are also applicable to double-hinge foldable devices. FIG. 12 depicts an example of a double-hinge foldable device in a folded state corresponding to a fold angle of 180°-α°. As can be seen from this figure, the bending radius (which is non-constant for a double-hinge foldable device) at any location of the folding region is much bigger than the thickness t (and thus is also bigger than the distance between the sensor MM layer and the cathode layer), such that a change in the capacitance $C_b$—i.e., $\Delta C_b$—caused by folding for a sensor electrode whose dimensions are changed by folding can be considered as being proportional to $\pi^* \delta^* \alpha°/180°$, as discussed above in connection with FIGS. 6A-6B. Indeed, the bending radius for double-hinge foldable devices is typically larger than the bending radius for single-hinge foldable devices, and, as such, the principles of operation discussed above in connection with FIGS. 6A-6B also apply to double-hinge foldable devices.

A difference, however, between double-hinge foldable devices and single-hinge foldable devices is that a folding region of the device may be larger for a double-hinge foldable device relative to a single-foldable device, such that there are more electrodes in the folding region having a respective dimension (width) changed by bending of the foldable device. To account for this difference, a relatively larger number of sensors may be used for measurement.

Figure 13A:
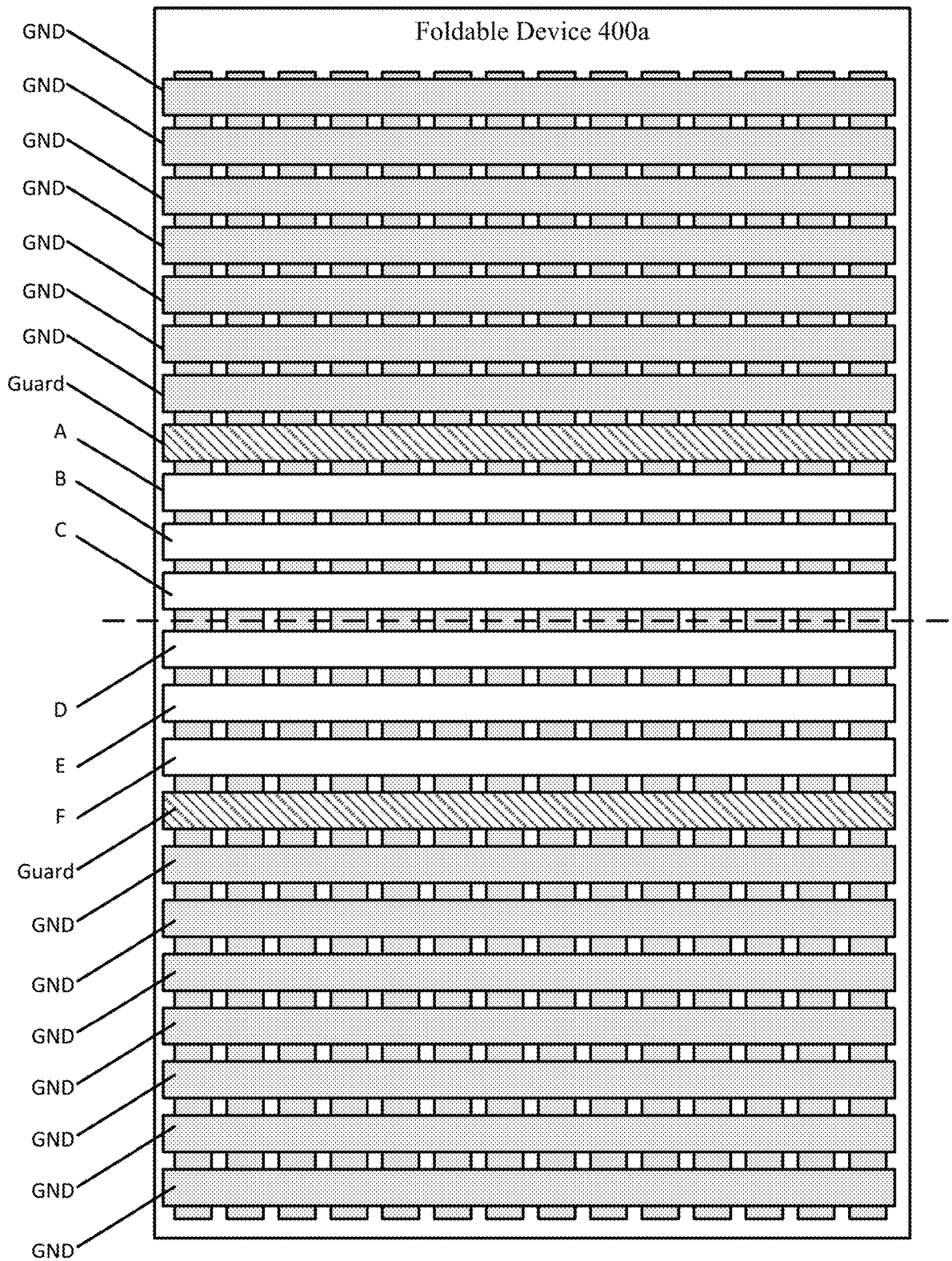
FIG. 13A depicts an example of a manner of operating a capacitive sensor array for a double-hinge foldable device in accordance with an exemplary embodiment of the present disclosure.

FIG. 13A depicts an example of a manner of operating a capacitive sensor array for a double-hinge foldable device in accordance with an exemplary embodiment of the present disclosure, whereby a larger number of sensors are used for measurement (e.g., relative to the example shown in FIG. 7A for a single-hinge foldable device). In this example, the bending of the double-hinge foldable device affects electrodes B, C, D and E depicted in FIG. 13A, whereas electrodes A and F depicted in FIG. 13A are located outside the folding region and are unaffected by the bending. Thus, similar to the principles discussed above regarding FIG. 7A, respective $\Delta C_{bA}$, $\Delta C_{bB}$, $\Delta C_{bC}$, $\Delta C_{bD}$, $\Delta C_{bE}$ and $\Delta C_{bF}$ values are determined based on the differences between the obtained absolute capacitance measurements for each electrode and baseline reference measurements obtained for each electrode. The folding signal for determining a fold angle may be, for example, calculated as $\Delta C_{bB} + \Delta C_{bC} + \Delta C_{bD} + \Delta C_{bE} - 2^*(\Delta C_{bA} + \Delta C_{bF})$, as $\Delta C_{bB}$, $\Delta C_{bC}$, $\Delta C_{bD}$, and $\Delta C_{bE}$ carry the signal indicative of the fold angle, whereas $\Delta C_{bA}$ and $\Delta C_{bF}$ are used to cancel out common interference factors such as display noise and temperature drift (thereby providing display noise rejection and temperature stability). While the capacitive measurements on electrodes A, B, C, D, E and F are being obtained, the adjacent electrodes may be guarded and the remaining electrodes may be grounded as shown in FIG. 13A.

Figure 13B:
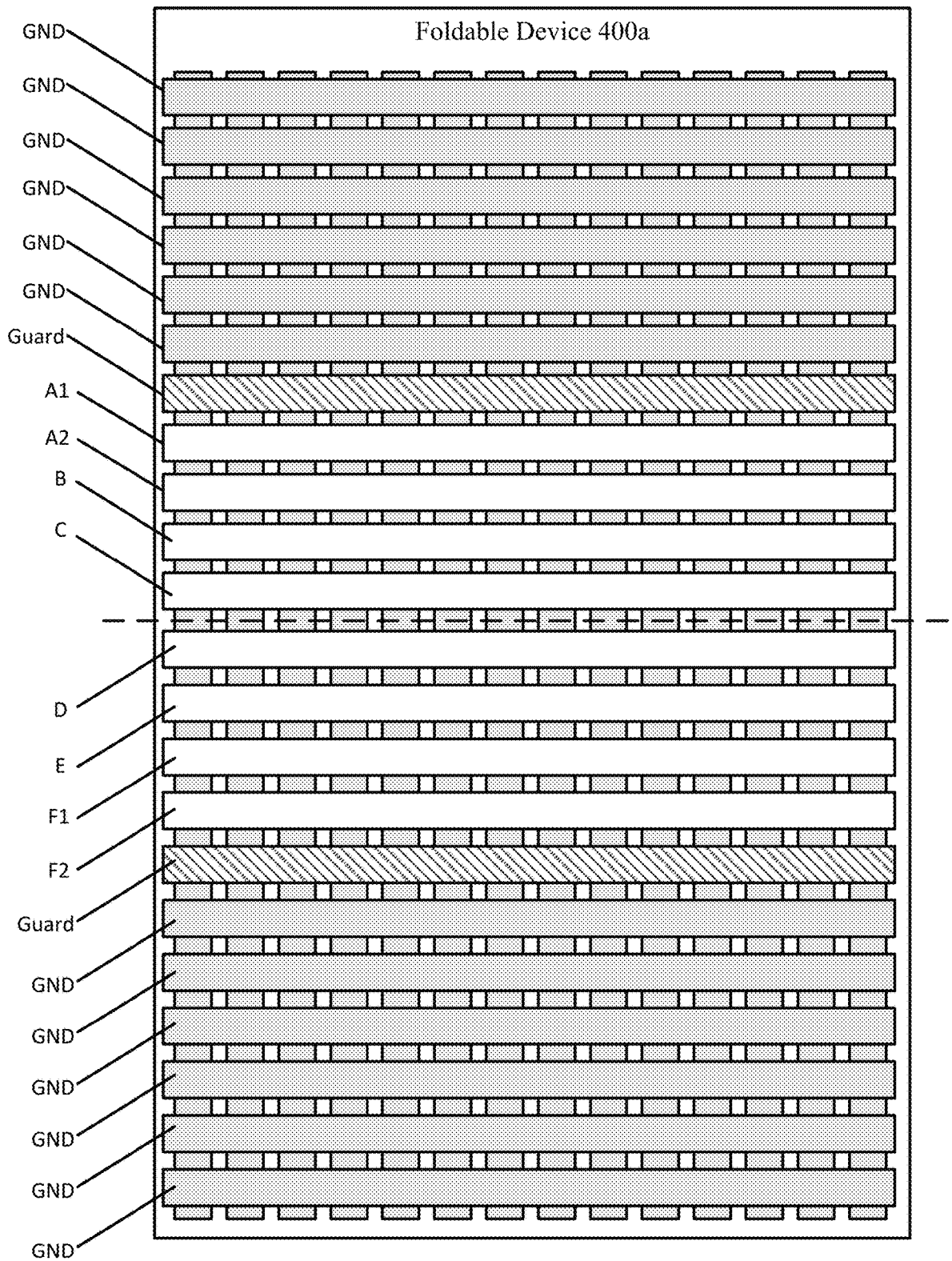
FIG. 13B depicts another example of a manner of operating a capacitive sensor array for a double-hinge foldable device in accordance with an exemplary embodiment of the present disclosure.

FIG. 13B depicts another example of a manner of operating a capacitive sensor array for a double-hinge foldable device in accordance with an exemplary embodiment of the present disclosure. FIG. 13B is similar to FIG. 13A in that the bending of the double-hinge foldable device affects electrodes B, C, D and E. However, instead of utilizing only two electrodes A and F outside the folding region which are unaffected by the bending for cancelling out common interference factors, in the example depicted in FIG. 13B, four electrodes A1, A2, F1 and F2 outside the folding region are utilized. Thus, similar to the principles discussed above regarding FIG. 7A, respective $\Delta C_{bA1}$, $\Delta C_{bA2}$, $\Delta C_{bB}$, $\Delta C_{bC}$, $\Delta C_{bD}$, $\Delta C_{bE}$, $\Delta C_{bF1}$, and $\Delta C_{bF2}$ values are determined based on the differences between the obtained absolute capacitance measurements for each electrode and baseline reference measurements obtained for each electrode. The folding signal for determining a fold angle may be, for example, calculated as $\Delta C_{bB}+\Delta C_{bC}+\Delta C_{bD}+\Delta C_{bE}-\Delta C_{bA1}-\Delta C_{bA2}-\Delta C_{bF1}-\Delta C_{bF2}$, as $\Delta C_{bB}$, $\Delta C_{bC}$, $\Delta C_{bD}$, and $\Delta C_{bE}$ carry the signal indicative of the fold angle, whereas $\Delta C_{bA1}$, $\Delta C_{bA2}$, $\Delta C_{bF1}$ and $\Delta C_{bF2}$ are used to cancel out common interference factors such as display noise and temperature drift (thereby providing display noise rejection and temperature stability). While the capacitive measurements on electrodes A1, A2, B, C, D, E, F1 and F2 are being obtained, the adjacent electrodes may be guarded and the remaining electrodes may be grounded as shown in FIG. 13B.

By utilizing four compensation channels (A1, A2, F1 and F2) as discussed in connection with FIG. 13B instead of two compensation channels (A and F) as discussed in connection with FIG. 13A, differences due to circuit variations may be cancelled out in addition to cancelling out display noise and temperature drift. To cancel out these circuit-related differences, the number of compensation channels to be used is equal to the number of sensing channels to be used. For example, in FIG. 7A, there are two sensing channels (B and C) and two compensation channels (A and D); similarly, in FIG. 13B, there are four sensing channels (B, C, D and E) and four compensation channels (A1, A2, F1 and F2).

It will be appreciated that FIGS. 13A-13B depict a single-fold double-hinge foldable device, and that the dotted line in FIGS. 13A-13B corresponds to the fold line, with the two hinges being disposed on either side of the fold line (e.g., a first hinge above the fold line and a second hinge below the fold line).

It will be appreciated that the principles depicted and discussed in the present disclosure—for example, with regard to the electrode layouts of FIGS. 4B-4D, the processes of FIGS. 5A-5C, the manners of operation of FIGS. 7B-9, the working principles of FIGS. 10A-10B, and the processes of FIGS. 11A-11B—are applicable to both double-hinge and single-hinge foldable devices. Indeed, the principles discussed herein may be applicable to a variety of foldable devices in which the dimensions of one or more sensor electrodes are affected by the bending of the foldable device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for determining a fold angle of a double-hinge foldable device, comprising:
   a plurality of electrodes, including at least two first electrodes and at least one second electrode, wherein the at least one second electrode is farther from a fold line of the double-hinge foldable device than the at least two first electrodes, and wherein a first hinge of the double-hinge foldable device is disposed on a first side of the fold line and a second hinge of the double-hinge foldable device is disposed on a second side of the fold line; and
   a processing system, configured to:
      obtain at least two first absolute capacitance measurements via the at least two first electrodes and at least one second absolute capacitance measurement via the at least one second electrode; and
      determine the fold angle of the double-hinge foldable device based on the at least two first absolute capacitance measurements and the at least one second absolute capacitance measurement.

2. The system according to claim 1, wherein dimensions of the at least two first electrodes are changed by folding of the double-hinge foldable device and dimensions of the at least one second electrode are unchanged by folding of the double-hinge foldable device.

3. The system according to claim 1, wherein dimensions of the at least one second electrode are changed to a lesser extent by folding of the double-hinge foldable device relative to the at least two first electrodes.

4. The system according to claim 1, wherein the at least two first electrodes comprise two first electrodes on the first side of the fold line of the double-hinge foldable device and two first electrodes on the second side of the fold line of the double-hinge foldable device;
   wherein the at least one second electrode comprises a second electrode on the first side of the fold line of the double-hinge foldable device and a second electrode on the second side of the fold line of the double-hinge foldable device; and wherein obtaining the at least two first absolute capacitance measurements via the at least two first electrodes and the at least one second absolute capacitance measurement via the at least one second electrode comprises obtaining absolute capacitance measurements from each of the two first electrodes on the first side of the fold line of the double-hinge foldable device, the two first electrodes on the second side of the fold line of the double-hinge foldable device, the second electrode on the first side of the fold line of the double-hinge foldable device, and the second electrode on the second side of the fold line of the double-hinge foldable device.

5. The system according to claim 1, wherein the processing system is further configured to:
while obtaining the at least two first absolute capacitance measurements via the at least two first electrodes and the at least one second absolute capacitance measurement via the at least one second electrode, guard and ground other electrodes of the plurality of electrodes.

6. The system according to claim 5, wherein guarding and grounding the other electrodes of the plurality of electrodes includes guarding an electrode adjacent to and farther from the fold line than the at least one second electrode.

7. The system according to claim 1, wherein determining the fold angle of the double-hinge foldable device comprises:
utilizing the at least one second absolute capacitance measurement to cancel out interference effects common to the at least two first electrodes and the at least one second electrode.

8. The system according to claim 7, wherein utilizing the at least one second absolute capacitance measurement to cancel out interference effects common to the at least two first electrodes and the at least one second electrode comprises subtracting the at least one second absolute capacitance measurement from the at least two first absolute capacitance measurements.

9. The system according to claim 1, wherein the at least two first electrodes comprise two first electrodes on the first side of the fold line of the double-hinge foldable device;
wherein the at least one second electrode comprises two second electrodes on the first side of the fold line of the double-hinge foldable device; and
wherein determining the fold angle of the double-hinge foldable device comprises: utilizing second absolute capacitance measurements from the two second electrodes on the first side of the fold line to cancel out interference effects common to the two first electrodes on the first side of the fold line and the two second electrodes on the first side of the fold line.

10. The system according to claim 1, wherein determining the fold angle of the double-hinge foldable device is further based on reference baseline measurements taken at a known fold angle.

11. The system according to claim 9, wherein determining the fold angle of the double-hinge foldable device comprises comparing the at least one first and at least one second absolute capacitance measurements to the reference baseline measurements.

12. A method for determining a fold angle of a double-hinge foldable device, comprising:
obtaining, by a processing system, at least two first absolute capacitance measurements via at least two first electrodes of a plurality of electrodes and at least one second absolute capacitance measurement via at least one second electrode of the plurality of electrodes,
wherein the at least one second electrode is farther from a fold line of the double-hinge foldable device than the at least two first electrodes, and wherein a first hinge of the double-hinge foldable device is disposed on a first side of the fold line and a second hinge of the double-hinge foldable device is disposed on a second side of the fold line; and
determining, by the processing system, the fold angle of the double-hinge foldable device based on the at least two first absolute capacitance measurements and the at least one second absolute capacitance measurement.

13. The method according to claim 12, wherein the at least two first electrodes comprise two first electrodes on the first side of the fold line of the double-hinge foldable device and two first electrodes on the second side of the fold line of the double-hinge foldable device;
wherein the at least one second electrode comprises a second electrode on the first side of the fold line of the double-hinge foldable device and a second electrode on the second side of the fold line of the double-hinge foldable device; and
wherein obtaining the at least two first absolute capacitance measurements via the at least two first electrodes and the at least one second absolute capacitance measurement via the at least one second electrode comprises obtaining absolute capacitance measurements from each of the two first electrodes on the first side of the fold line of the double-hinge foldable device, the two first electrodes on the second side of the fold line of the double-hinge foldable device, the second electrode on the first side of the fold line of the double-hinge foldable device, and the second electrode on the second side of the fold line of the double-hinge foldable device.

14. The method according to claim 12, further comprising:
while obtaining the at least two first absolute capacitance measurements via the at least two first electrodes and the at least one second absolute capacitance measurement via the at least one second electrode, guarding and grounding other electrodes of the plurality of electrodes.

15. The method according to claim 12, wherein determining the fold angle of the double-hinge foldable device comprises:
utilizing the at least one second absolute capacitance measurement to cancel out interference effects common to the at least two first electrodes and the at least one second electrode.

16. The method according to claim 12, wherein the at least two first electrodes comprise two first electrodes on the first side of the fold line of the double-hinge foldable device;
wherein the at least one second electrode comprises two second electrodes on the first side of the fold line of the double-hinge foldable device; and
wherein determining the fold angle of the double-hinge foldable device comprises: utilizing second absolute capacitance measurements from the two second electrodes on the first side of the fold line to cancel out interference effects common to the two first electrodes on the first side of the fold line and the two second electrodes on the first side of the fold line.

17. A non-transitory computer-readable medium having processor-executable instructions stored thereon for determining a fold angle of a double-hinge foldable device, wherein the processor-executable instructions, when executed, facilitate:

obtaining, by a processing system, at least two first absolute capacitance measurements via at least two first electrodes of a plurality of electrodes and at least one second absolute capacitance measurement via at least one second electrode of the plurality of electrodes, wherein the at least one second electrode is farther from a fold line of the double-hinge foldable device than the at least two first electrodes, and wherein a first hinge of the double-hinge foldable device is disposed on a first side of the fold line and a second hinge of the double-hinge foldable device is disposed on a second side of the fold line; and determining, by the processing system, the fold angle of the double-hinge foldable device based on the at least two first absolute capacitance measurements and the at least one second absolute capacitance measurement.

18. The non-transitory computer-readable medium according to claim 17, wherein the at least two first electrodes comprise two first electrodes on the first side of the fold line of the double-hinge foldable device and two first electrodes on the second side of the fold line of the double-hinge foldable device;

wherein the at least one second electrode comprises a second electrode on the first side of the fold line of the double-hinge foldable device and a second electrode on the second side of the fold line of the double-hinge foldable device; and wherein obtaining the at least two first absolute capacitance measurements via the at least two first electrodes and the at least one second absolute capacitance measurement via the at least one second electrode comprises obtaining absolute capacitance measurements from each of the two first electrodes on the first side of the fold line of the double-hinge foldable device, the two first electrodes on the second side of the fold line of the double-hinge foldable device, the second electrode on the first side of the fold line of the double-hinge foldable device, and the second electrode on the second side of the fold line of the double-hinge foldable device.

19. The non-transitory computer-readable medium according to claim 17, wherein the processor-executable instructions, when executed, further facilitate:

while obtaining the at least two first absolute capacitance measurements via the at least two first electrodes and the at least one second absolute capacitance measurement via the at least one second electrode, guarding and grounding other electrodes of the plurality of electrodes.

20. The non-transitory computer-readable medium according to claim 17, wherein determining the fold angle of the double-hinge foldable device comprises:

utilizing the at least one second absolute capacitance measurement to cancel out interference effects common to the at least two first electrodes and the at least one second electrode.

* * * * *